United States Patent
Figueroa et al.

(10) Patent No.: US 12,252,574 B2
(45) Date of Patent: Mar. 18, 2025

(54) BIS-PHENYL-PHENOXY POLYOLEFIN PROCATALYSTS HAVING TWO ANTHRACENYL LIGANDS

(71) Applicant: Dow Global Technologies LLC, Midland, MI (US)

(72) Inventors: Ruth Figueroa, Midland, MI (US); Robert D. Grigg, Midland, MI (US); Jerzy Klosin, Midland, MI (US); Tulaza Vaidya, Royersford, PA (US); Carl N. Iverson, Los Alamos, NM (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/472,617

(22) Filed: Oct. 10, 2023

(65) Prior Publication Data
US 2024/0084050 A1    Mar. 14, 2024

Related U.S. Application Data

(63) Continuation of application No. 17/267,587, filed as application No. PCT/US2019/049015 on Aug. 30, 2019, now abandoned.

(60) Provisional application No. 62/725,074, filed on Aug. 30, 2018.

(51) Int. Cl.
| | |
|---|---|
| C07F 7/00 | (2006.01) |
| C08F 4/64 | (2006.01) |
| C08F 4/659 | (2006.01) |
| C08F 210/16 | (2006.01) |

(52) U.S. Cl.
CPC ............ *C08F 4/65908* (2013.01); *C07F 7/00* (2013.01); *C08F 4/64193* (2013.01); *C08F 210/16* (2013.01)

(58) Field of Classification Search
CPC ....... C07F 7/00; C08F 4/64193; C08F 210/16
See application file for complete search history.

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,515,155 B1 | 2/2003 | Klosin et al. |
| 6,696,379 B1 | 2/2004 | Carnahan et al. |
| 6,869,904 B2 | 3/2005 | Boussie et al. |
| 7,060,848 B2 | 6/2006 | Boussie et al. |
| 7,163,907 B1 | 1/2007 | Canich et al. |
| 7,951,882 B2 | 5/2011 | Arriola et al. |
| 8,609,794 B2 | 12/2013 | Klosin et al. |
| 8,729,201 B2 | 5/2014 | Fontaine et al. |
| 9,029,487 B2 | 5/2015 | Klosin et al. |
| 9,102,819 B2 | 8/2015 | Kapur et al. |
| 9,522,855 B2 | 12/2016 | Klosin et al. |
| 9,527,940 B2 | 12/2016 | Demirors et al. |
| 9,527,941 B2 | 12/2016 | Demirors et al. |
| 9,601,230 B2 | 3/2017 | Nair et al. |

(Continued)

FOREIGN PATENT DOCUMENTS

| | | |
|---|---|---|
| CN | 102712795 A | 10/2012 |
| GB | 1069848 A | 5/1967 |

(Continued)

OTHER PUBLICATIONS

Zimm, Bruno H., "Apparatus and Methods for Measurement and Interpretation of the Angular Variation of Light Scattering; Preliminary Results on Polystyrene Solutions", Journal of Chemical Physics, 1948, vol. 16, 12, 1099-1116.

Soave, Giorgio, "Equilibrium Constants from a Modified Redlich-Kwong Equation of State", Chemical Engineering Science, 1972, vol. 27, pp. 1197-1203.

Balke et al., "A Strategy for Interpreting Multidetector Size-Exclusion Chromatgraphy Data II", Chromatography of Polymers, 1992, Chapter 13, pp. 199-219.

(Continued)

*Primary Examiner* — Caixia Lu
(74) *Attorney, Agent, or Firm* — Dinsmore & Shohl LLP

(57) ABSTRACT

Embodiments of this disclosure are directed to catalyst systems comprising a metal-ligand complex according to formula (I):

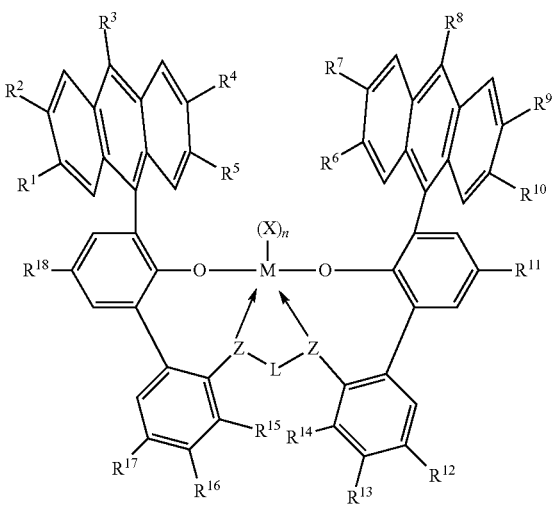

19 Claims, No Drawings

(56) References Cited

U.S. PATENT DOCUMENTS

| | | |
|---|---|---|
| 9,601,231 B2 | 3/2017 | Klosin et al. |
| 9,605,098 B2 | 3/2017 | Klosin et al. |
| 2004/0005984 A1 | 1/2004 | Boussie et al. |
| 2007/0136496 A1 | 6/2007 | Hendel et al. |
| 2011/0039082 A1 | 2/2011 | Yun et al. |
| 2011/0082249 A1 | 4/2011 | Shan et al. |
| 2011/0146044 A1 | 6/2011 | Pecherzewski |
| 2011/0282018 A1 | 11/2011 | Klosin et al. |
| 2014/0330056 A1 | 11/2014 | Klosin et al. |
| 2014/0357918 A1 | 12/2014 | Klosin et al. |
| 2015/0337062 A1 | 11/2015 | Demirors et al. |
| 2015/0337063 A1 | 11/2015 | Demirors et al. |
| 2015/0344601 A1 | 12/2015 | Demirors et al. |
| 2015/0344602 A1 | 12/2015 | Demirors et al. |

FOREIGN PATENT DOCUMENTS

| | | | |
|---|---|---|---|
| JP | 2000159829 A | | 6/2000 |
| JP | 2001525859 A | | 12/2001 |
| JP | 2005523921 A | | 8/2005 |
| JP | 2011525212 A | | 9/2011 |
| JP | 2013521382 A | | 6/2013 |
| JP | 2013534934 A | | 9/2013 |
| JP | 2013541631 A | | 11/2013 |
| JP | 2013544940 A | | 12/2013 |
| WO | 2003091262 A1 | | 11/2003 |
| WO | 2007136494 A2 | | 11/2007 |
| WO | 2007136496 A2 | | 11/2007 |
| WO | 2010061630 A1 | | 6/2010 |
| WO | 2011025784 A1 | | 3/2011 |
| WO | 2011041696 A1 | | 4/2011 |
| WO | 2011109563 A2 | | 9/2011 |
| WO | 2011146044 A1 | | 11/2011 |
| WO | 2011146291 A1 | | 11/2011 |
| WO | 2012004683 A2 | | 1/2012 |
| WO | 2012027448 A1 | | 3/2012 |
| WO | 2012064630 A2 | | 5/2012 |
| WO | 2013101375 A1 | | 7/2013 |
| WO | 2014105411 A1 | | 7/2014 |
| WO | 2014105412 A1 | | 7/2014 |
| WO | 2014105413 A1 | | 7/2014 |
| WO | 2014209927 A1 | | 12/2014 |
| WO | 2015045928 A1 | | 4/2015 |
| WO | 2015045930 A1 | | 4/2015 |
| WO | 2017058858 A1 | | 4/2017 |
| WO | 2017173080 A1 | | 10/2017 |
| WO | 2018022975 A1 | | 2/2018 |

OTHER PUBLICATIONS

Mourey et al., "Characterization by SEC and FFF", Chromatography of Polymers, 1992, Chapter 12, pp. 180-198.

Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.

Monrabal et al., Macromol. Symp. 2007, 257, 71-79.

Yau, Wallace W., "Examples of Using 3D-GPC-TREF for Polyolefin Characterization", Macromol. Symp., 2007, 257, 29-45.

International Search Report and Written Opinion pertaining to PCT/US2019/049015, dated Nov. 18, 2019.

Bonvonsombat et al., "Regioselective Iodination of Phenol and Analogues Using N-Iodosuccinimide and p-toluenesulfonic Acid", Tetrahedron Letters, 2009, 50, 2664-2667.

Office Action pertaining to Chinese Patent Application No. 21980052414.X dated Sep. 20, 2022, 3 pages.

Search Reporting pertaining to Chinese Patent Application No. 201980052414.X dated Sep. 20, 2022, 3 pages.

Korean Office Action dated Oct. 16, 2024, pertaining to KR Patent Application No. 10-2021-7008631, 5 pgs.

BIS-PHENYL-PHENOXY POLYOLEFIN PROCATALYSTS HAVING TWO ANTHRACENYL LIGANDS

CROSS REFERENCE TO RELATED APPLICATION

This application is a Continuation of the U.S. application Ser. No. 17/267,587, filed Feb. 10, 2021, which claims the benefit of International Patent Application No. PCT/US2019/049015, filed Aug. 30, 2019, which claims the benefit of U.S. Provisional Patent Application Ser. No. 62/725,074 filed Aug. 30, 2018, all of which is hereby incorporated by reference in their entireties.

TECHNICAL FIELD

Embodiments of the present disclosure generally relate to olefin polymerization catalyst systems and processes and, more specifically to bis-phenylphenoxy polyolefin procatalyst having two anthracenyl.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin-based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, acid/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

There is an ongoing need to create catalyst systems or procatalysts with a highly selectivity toward ethylene during ethylene and α-olefin copolymerization reactions. Additionally, the procatalyst should have high catalyst efficiency, high reactivity, and a versatile ability to produce polymers with a high or low molecular weight at high temperature (such as greater than 140° C. or approximately 190° C.).

According to some embodiments, a catalyst system may include a metal-ligand complex according to formula (I):

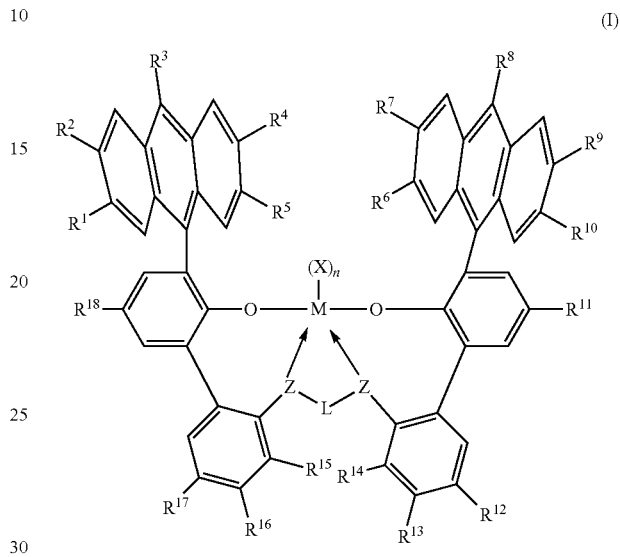

In formula (I), M is a metal chosen from titanium, zirconium, or hafnium, the metal being in a formal oxidation state of +2, +3, or +4. Subscript n of $(X)_n$ is 0, 1, or 2. When n is 1, X is a monodentate ligand or a bidentate ligand; and when n is 2, each X is independently a monodentate ligand and is the same or different; each Z is independently chosen from —O—, —S—, —N($R^N$)—, or —P($R^P$)— and L is $(C_2-C_{40})$hydrocarbylene or $(C_2-C_{40})$heterohydrocarbylene. Each of $R^1$, $R^2$, $R^3$, $R^4$, $R^5$, $R^6$, $R^7$, $R^8$, $R^9$, and $R^{10}$ is independently chosen from $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, —$R^C$OC(O)—, $R^C$C(O)N($R^N$)—, $(R^C)_2$NC(O)—, halogen, or —H, provided at least one of $R^1$, $R^2$, $R^3$, $R^4$, $R^5$, $R^6$, $R^7$, $R^8$, $R^9$, and $R^{10}$ is not —H. $R^{11}$, $R^{12}$, $R^{13}$, $R^{14}$, $R^{15}$, $R^{16}$, $R^{17}$ and $R^{18}$ are independently chosen from $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, —$R^C$S(O)$_{27}$, $(R^C)_2$C=N—, $R^C$C(O)O—, $R^C$OC(O)—, $R^C$C(O)N(R)—, $(R^C)_2$NC(O)—, halogen, or —H. Each $R^C$, $R^P$, and $R^N$ in formula (I) is independently a $(C_1-C_{30})$hydrocarbyl or —H.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; CV: column volume (used in column chromatography); EtOAc: ethyl acetate; Pd(AmPhos)Cl$_2$: Bis(di-tert-butyl(4-dimethylaminophenyl)phosphine)dichloropalladium(II); Pd(dppf)Cl$_2$: [1,1'-Bis(diphenylphosphino)ferrocene]palladium(II) dichloride; PhMe: toluene; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{50}$)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "($C_x$ $C_y$)" parenthetical may contain more than y carbon atoms depending on the identity of any groups $R^S$. For example, a "($C_1$-$C_{50}$)alkyl substituted with exactly one group $R^S$, where $R^S$ is phenyl (—$C_6H_5$)" may contain from 7 to 56 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene (such as benzyl (—$CH_2$—$C_6H_5$)).

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{50}$)aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl include: substituted ($C_1$-$C_{20}$)aryl; substituted ($C_6$-$C_{18}$)aryl; 2,4-bis([$C_{20}$]alkyl)-phenyl; polyfluorophenyl; pentafluorophenyl; and fluoren-9-one-1-yl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloakyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{50}$)hydrocarbylene include unsubstituted or substituted ($C_6$-$C_{50}$)arylene, ($C_3$-$C_{50}$)cycloalkylene, and ($C_1$-$C_{50}$)alkylene (e.g., ($C_1$-$C_{20}$)alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α, ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$) arylene α,ω-diradicals include phenyl-1,4-diyl, napthalen-2,6-diyl, or napthalen-3,7-diyl.

The term "($C_1$-$C_{50}$)alkylene" means a saturated straight chain or branched chain diradical (i.e., the radicals are not on ring atoms) of from 1 to 50 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to from a ($C_1$-$C_{18}$) alkylene, examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo[2.2.2]octane.

The term "($C_3$-$C_{50}$)cycloalkylene" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, $N=C(R^C)_2$, —$Ge(R^C)_2$—, or —Si$(R^C)$—, where each $R^C$ and each $R^P$ is unsubstituted ($C_1$-$C_{18}$)hydrocarbyl or —H, and where each $R^N$ is unsubstituted ($C_1$-$C_{18}$)hydrocarbyl. The term "heterohydrocarbon" refers to a molecule or molecular framework in which one or more carbon atoms of a hydrocarbon are replaced with a heteroatom. The term "($C_1$-$C_{50}$)heterohydrocarbyl" means a heterohydrocarbon radical of from 1 to 50 carbon atoms, and the term "($C_1$-$C_{50}$)heterohydrocarbylene" means a heterohydrocarbon diradical of from 1 to 50 carbon atoms. The heterohydrocarbon of the ($C_1$-$C_{50}$)heterohydrocarbyl or the ($C_1$-$C_{50}$)heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each ($C_1$-$C_{50}$)heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The ($C_1$-$C_{50}$)heterohydrocarbyl may be unsubstituted or substituted. Non-limiting examples of the ($C_1$-$C_{50}$)heterohydrocarbyl include ($C_1$-$C_{50}$)heteroalkyl, ($C_1$-$C_{50}$)hydrocarbyl-O—, ($C_1$-$C_{50}$)hydrocarbyl-S—, ($C_1$-$C_{50}$)hydrocarbyl-S(O)—, ($C_1$-$C_{50}$)hydrocarbyl-$S(O)_2$—, ($C_1$-$C_{50}$)hydrocarbyl-$Si(R^{92}$—, ($C_1$-$C_{50}$)hydrocarbyl-$N(R^N)$—, ($C_1$-$C_{50}$)hydrocarbyl-$P(R^P)$—, ($C_2$-$C_{50}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$) heteroalkylene, ($C_1$-$C_{50}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_4$-$C_{50}$)heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; triazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "($C_1$-$C_{50}$)heteroalkyl" means a saturated straight or branched chain radical containing one to fifty carbon atoms and one or more heteroatom. The term "($C_1$-$C_{50}$)heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)^3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include catalyst systems that include a metal-ligand complex according to formula (I):

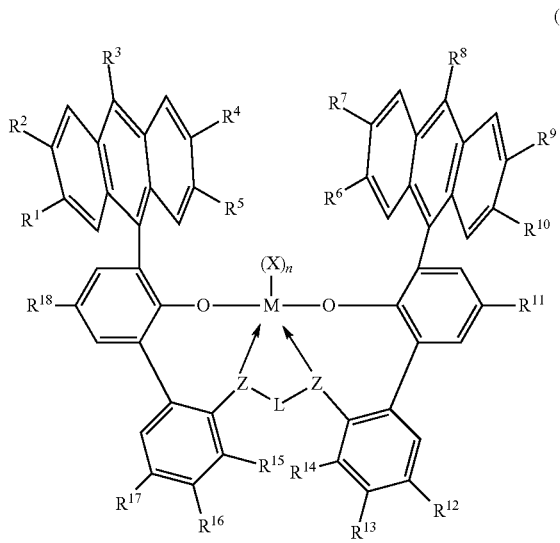

(I)

In formula (I), M is a metal chosen from titanium, zirconium, or hafnium, the metal being in a formal oxidation state of +2, +3, or +4. Subscript n of $(X)_n$ is 0, 1, or 2. When n is 1, X is a monodentate ligand or a bidentate ligand; and when n is 2, each X is an independently chosen monodentate ligand; the metal-ligand complex is overall charge-neutral; each Z is independently chosen from —O—, —S—, —N($R^N$)—, or —P($R^P$)—. $R^1$, $R^2$, $R^3$, $R^4$, $R^5$, $R^6$, $R^7$, $R^8$, $R^9$, and $R^{10}$ are independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, —$R^C$S(O)$_2$—, ($R^C$)$_2$C=N—, $R^C$C(O)O—, $R^C$OC(O)—, $R^C$C(O)N($R^N$)—, halogen, or —H, provided at least one of $R^1$, $R^2$, $R^3$, $R^4$, $R^5$, $R^6$, $R^7$, $R^8$, $R^9$, and $R^{10}$ is not —H. Each of $R^{11}$ and $R^{18}$, $R^{12}$ and $R^{17}$, $R^{13}$ and $R^{16}$, and $R^{14}$ and $R^{15}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, —$R^C$C(O)O—, $R^C$OC(O)—, $R^C$C(O)N(R)—, ($R^C$)$_2$NC(O)—, halogen, or —H. Each $R^C$, $R^P$, and $R^N$ in formula (I) is independently a ($C_1$-$C_{30}$)hydrocarbyl or —H.

In embodiments, M, in the metal-ligand complex of formula (I), may be a transition metal such as titanium (Ti), zirconium (Zr), or hafnium (Hf), and the transition metal may have a formal oxidation state of +2, +3, or +4. The subscript n of $(X)_n$ is 1, 2, or 3 and refers to a number of ligands X bonded to or associated with the metal, M.

In some embodiments, in the metal-ligand complex according to formula (I), at least one of $R^1$, $R^2$, $R^3$, $R^4$, and $R^5$ is ($C_3$-$C_{10}$)alkyl, —SiR$^C_3$, or —GeR$^C_3$; or at least one of $R^6$, $R^7$, $R^8$, $R^9$, and $R^{10}$ is a ($C_3$-$C_{10}$)alkyl, —SiR$^C_3$, or —GeR$^C_3$, wherein $R^C$ is ($C_1$-$C_{10}$)alkyl. In other embodiments, at least one of $R^1$, $R^2$, $R^3$, $R^4$, and $R^5$ is a ($C_3$-$C_{10}$)alkyl, —SiR$^C_3$, or —GeR$^C_3$; and at least one of $R^6$, $R^7$, $R^8$, $R^9$, and $R^{10}$ is a ($C_3$-$C_{10}$)alkyl, —SiR$^C$, or —GeR$^C$, wherein each $R^C$ independently is ($C_1$-$C_{10}$)alkyl. In some embodiments, $R^C$ of —SiR$^C_3$ or —GeR$^C_3$ is methyl, ethyl, or ($C_3$-$C_{10}$)alkyl.

Examples of ($C_3$-$C_{10}$)alkyl include, but are not limited to: 1-propyl, 2-propyl (also called iso-propyl), 1,1-dimethyl-ethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In some embodiments, in the metal-ligand complex according to formula (I), at least one of $R^1$, $R^5$, $R^6$, and $R^{10}$ is ($C_3$-$C_{10}$)alkyl, —SiR$^C_3$, or —GeR$^C_3$, wherein $R^C$ is ($C_1$-$C_{10}$)alkyl. In other embodiments, at least one of $R^1$ and $R^5$ is a ($C_3$-$C_{10}$)alkyl, —SiR$^C_3$, or —GeR$^C_3$; and at least one of $R^6$ and $R^{10}$ is a ($C_3$-$C_{10}$)alkyl, —SiR$^C$, or —GeR$^C$, wherein each $R^C$ independently is ($C_1$-$C_{10}$)alkyl. In some embodiments, $R^C$ of —SiR$^C_3$ or —GeR$^C_3$ is methyl, ethyl, or ($C_3$-$C_{10}$)alkyl. Without intending to be bound by theory, it is believed that a substituent in one of $R^1$, $R^5$, $R^6$, or $R^{10}$ positions or a substituent in any two of the $R^1$, $R^5$, $R^6$, or $R^{10}$ positions affects the reactivity of the catalyst and may increase catalyst selectivity toward incorporating ethylene monomers into the polymer chain over incorporating α-olefin monomers such as 1-octene, for example, into the polymer chain.

In some embodiments, in the metal-ligand complex according to formula (I), at least one of $R^1$, $R^5$, $R^6$, and $R^{10}$ is ($C_3$-$C_{10}$)alkyl, —SiR$^C$3, or —GeR$^C$3, and $R^2$ and $R^7$ are ($C_3$-$C_{10}$)alkyl, —Si($R^C$)$_3$, or —Ge($R^C$)$_3$. In other embodiments, at least one of $R^1$, $R^5$, $R^6$, and $R^{10}$ is ($C_3$-$C_{10}$)alkyl, —SiR$^C_3$, or —GeR$^C_3$, and $R^2$ and $R^7$ are ($C_3$-$C_{10}$)alkyl, —Si($R^C$)$_3$, or —Ge($R^C$)$_3$.

In some embodiments, in the metal-ligand complex according to formula (I), at least one of $R^1$, $R^5$, $R^6$, and $R^{10}$ is ($C_3$-$C_{10}$)alkyl, —SiR$^C$3, or —GeR$^C$3, and $R^3$ and $R^8$ are ($C_3$-$C_{10}$)alkyl, —Si($R^C$)$_3$, or —Ge($R^C$)$_3$.

In one or more embodiments, $R^1$, $R^4$, $R^6$, and $R^9$ are independently ($C_3$-$C_{10}$)alkyl. In some embodiments, $R^1$, $R^5$, $R^6$, and $R^{10}$ are tert-butyl, and $R^3$, $R^4$, $R^7$, $R^8$, and $R^9$ are —H. In some embodiments, $R^1$, $R^2$, $R^9$, and $R^{10}$ are tert-butyl, and $R^3$, $R^4$, $R^5$, $R^6$, $R^7$, and $R^8$ are —H.

In some embodiments, in the metal-ligand complex according to formula (I), $R^5$ and $R^{12}$ are independently ($C_1$-$C_{12}$)alkyl. Examples of such ($C_1$-$C_{12}$)alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl. In some embodiments, $R^5$ and $R^{10}$ are halogen.

In some embodiments, in the metal-ligand complex according to formula (I), $R^8$ and $R^9$ are methyl.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3+)$ $(PhCH_2B(C_6F_5)_3^-)$ where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of —1. Each monoanionic ligand may independently be hydride, $(C_1-C_{40})$hydrocarbyl carbanion, $(C_1-C_{40})$heterohydrocarbyl carhanion, halide, nitrate, carbonate, phosphate, sulfate, $HC(O)O^-$, $HC(O)N(H)^-$, $(C_1-C_{40})$hydrocarbylC(O)O$^-$, $(C_1-C_{40})$hydrocarbylC(O)N$((C_1-C_{20})$hydrocarbyl$)^-$, $(C_1-C_{40})$hydrocarbylC(O)N(H)$^-$, $R^KR^LB^-$, $R^KR^LN^-$, or $R^KO^-$, $R^KS^-$, $R^KR^LP^-$, $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^XNR^KR^L$, $R^KOR^L$, $R^KSR^L$, or $R^XPR^KR^L$, where each $R^K$ independently is hydrogen, $[(C_1-C_{10})$hydrocarbyl$]_3Si(C_1-C_{10})$hydrocarbyl, $(C_1-C_{40})$hydrocarbyl, $[(C_1-C_{10})$hydrocarbyl$]3Si$, or $(C_1-C_{40})$heterohydrocarbyl and each $R^K$ and $R^L$ independently is as previously defined.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^r$ independently is an unsubstituted $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_1)$hydrocarbylC(O)O—, or $R^KR^LN$— wherein each of $R^K$ and $R^L$ independently is an unsubstituted $(C_1-C_{10})$hydrocarbyl.

In further embodiments in which n is 2 or 3, such that there are at least two groups X, any two groups X may be joined to form a bidentate: ligand. In illustrative embodiments including a bidentate ligand, the bidentate ligand may be a neutral bidentate ligand. In one embodiment, the neutral bidentate ligand is a diene of formula $(R^D)_2C=C(R^D)—C(R^D)=C(R^D)_2$, wherein each $R^D$ independently is H, unsubstituted $(C_1-C_6)$alkyl, phenyl, or naphthyl. In some embodiments the bidentate ligand is a monoanionic ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)O^-$, $(C_2-C_{40})$hydrocarbylene dicarbanion, $(C_1-C_{40})$heterohydrocarbylene dicarbanion, phosphate, or sulfate.

In further embodiments, X is selected from methyl; ethyl; 1-propyl; 2-propyl; 1-butyl; 2,2,-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In the metal-ligand complex of formula (I), each Z independently is O, S, $N(C_1-C_{40})$hydrocarbyl, or $P(C_1-C_{40})$hydrocarbyl. In some embodiments, each Z is different. For example, one Z is O and the other Z is $NCH_3$. In some embodiments, one Z is O and one Z is S. In another embodiment, one Z is S and one Z is $N(C_1-C_{40})$hydrocarbyl, (for example, $NCH_3$). In a further embodiment, each Z is the same. In yet another embodiment, each Z is O. In another embodiment, each Z is S.

In formula (I), L is $(C_2-C_{40})$hydrocarbylene or $(C_2-C_{40})$heterohydrocarbylene. In one or more embodiments, the diradical of L that covalently links each Z and includes from 2 to 10 atoms.

In some embodiments of formula (I), the L is chosen from $(C_3-C_7)$alkyl 1,3-diradicals such as —$CH_2CH_2CH_2$—, —$CH(CH_3)CH_2C*H(CH_3)$, —$CH(CH_3)CH(CH_3)C*H(CH_3)$, —$CH_2C(CH_3)_2CH_2$—, cyclopentan-1,3-diyl, or cyclohexan-1,3-diyl. In some embodiments, the L is chosen from $(C_4-C_{10})$alkyl 1,4-diradicals such as —$CH_2CH_2CH_2CH_2$—, —$CH_2C(CH_3)_2C(CH_3)_2CH_2$—, cyclohexane-1,2-diyldimethyl, and bicyclo[2.2.2]octane-2,3-diyldimethyl. In some embodiments, L is chosen from $(C_5-C_{12})$alkyl 1,5-diradicals such as —$CH_2CH_2CH_2CH_2CH_2$—, 1,3-bis(methylene)cyclohexane. In some embodiments, L is chosen from $(C_6-C_{14})$ alkyl 1,6-diradicals such as —$CH_2CH_2CH_2CH_2CH_2CH_2$— or 1,2-bis(ethylene)cyclohexane.

In one or more embodiments, L is $(C_2-C_{40})$heterohydrocarbylene, in which the diradical of L that covalently links each Z and includes from 2 to 10 atoms. In some embodiments, L is —$CH_2Ge(R^C)_2CH_2$—. In other embodiments, L is —$CH_2Si(R^C)_2CH_2$—. Each $R^C$ is independently $(C_1-C_{30})$hydrocarbyl. In some embodiments, each $R^C$ is independently $(C_2-C_{30})$hydrocarbyl, such as ethyl, 2-propyl, cyclopentyl, or cyclohexyl.

In specific embodiments of catalyst systems, the metal-ligand complex according to formula (I) may include, without limitation, a complex having the structure of any of Procatalysts 1-22:
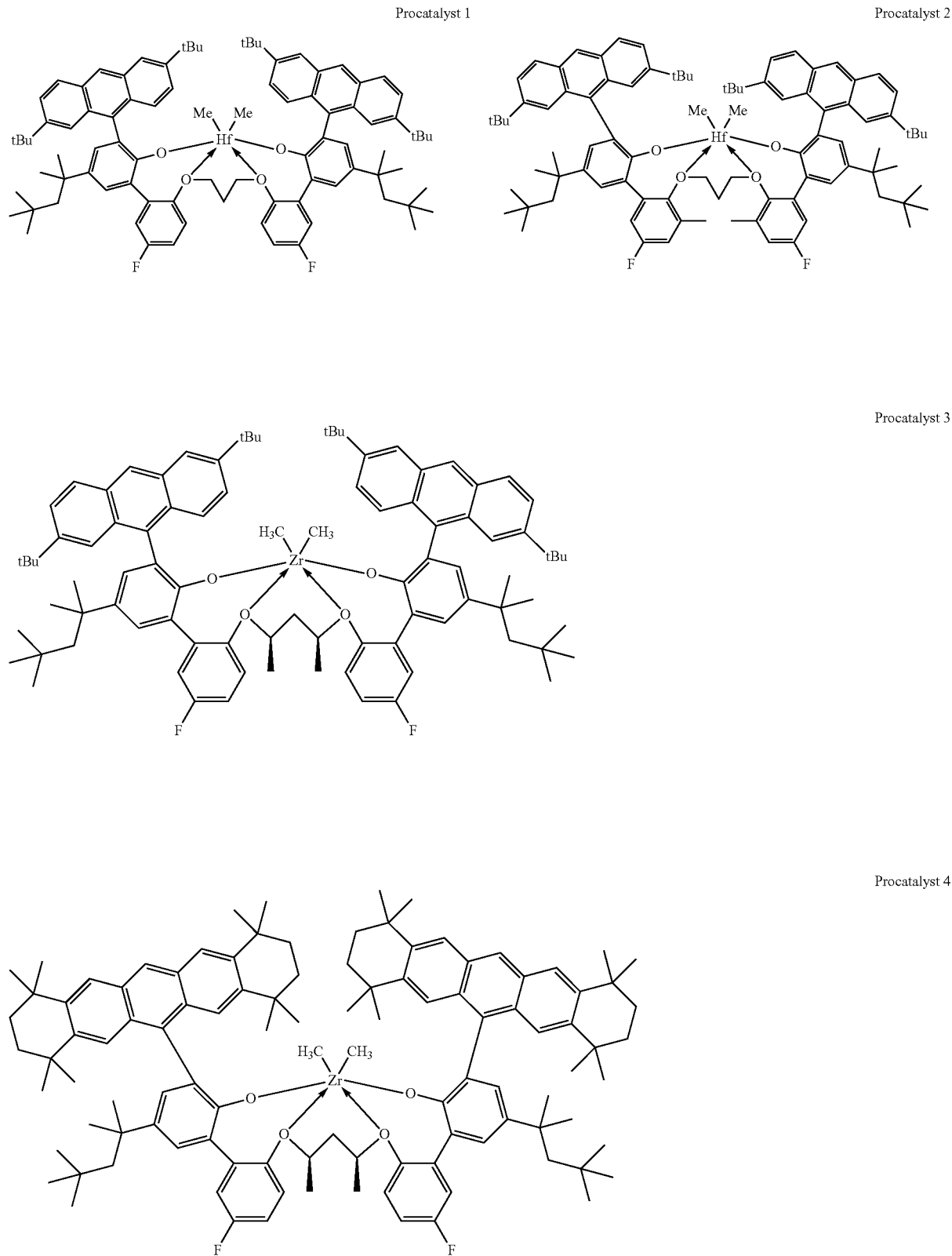

-continued
Procatalyst 5
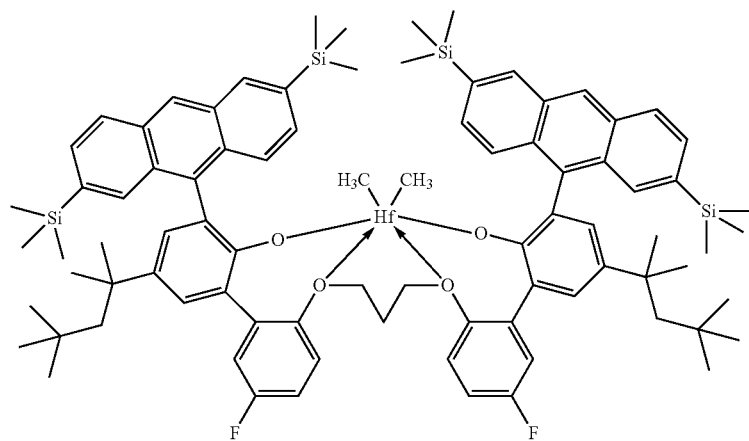
Procatalyst 6
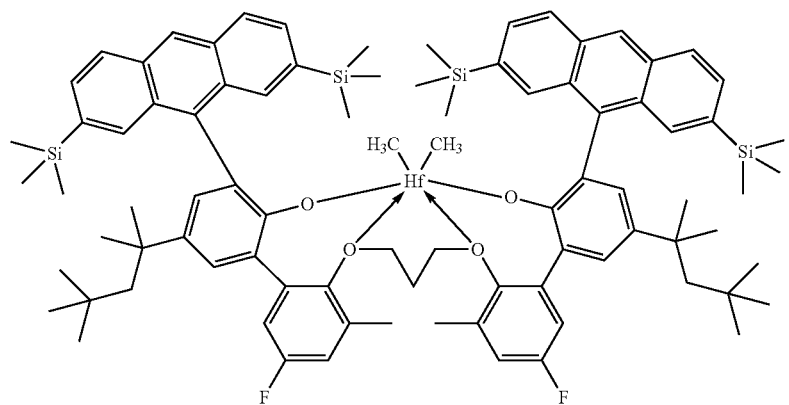
Procatalyst 7
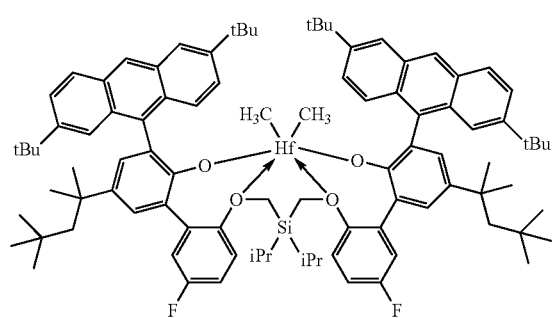
Procatalyst 8
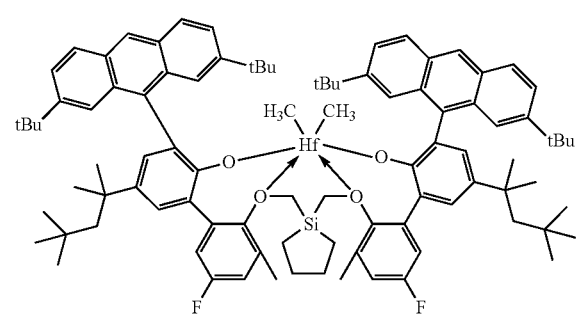
Procatalyst 9
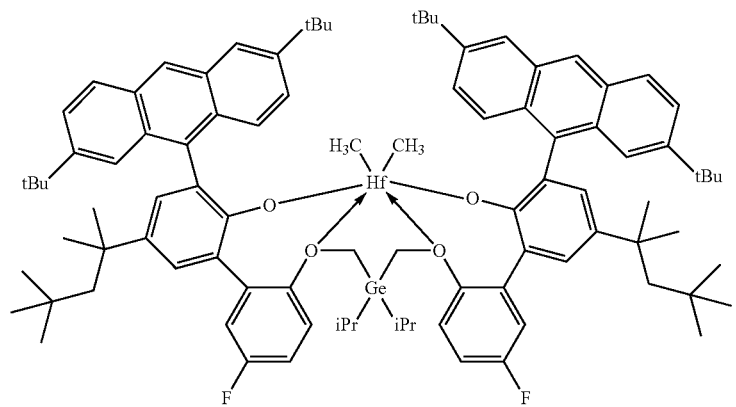

-continued
Procatalyst 10
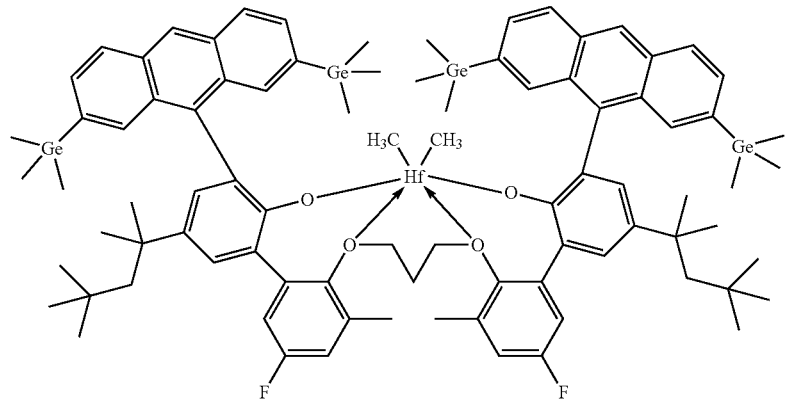
Procatalyst 11
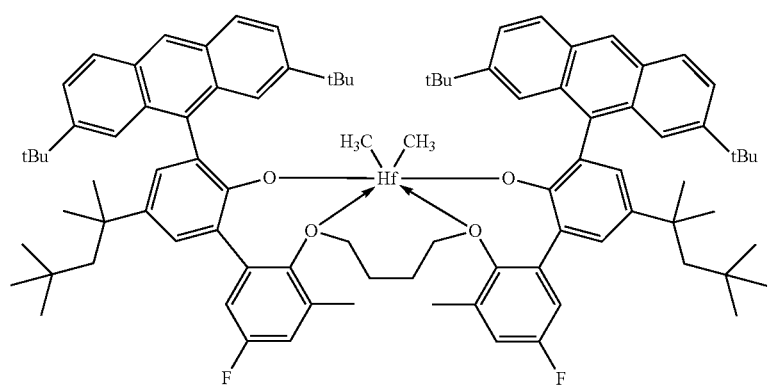
Procatalyst 12
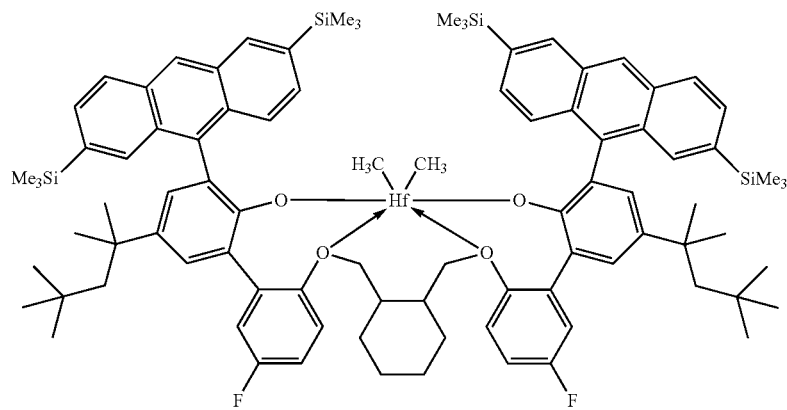
Procatalyst 13
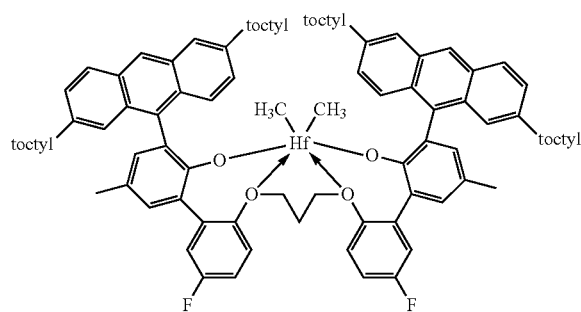
Procatalyst 14
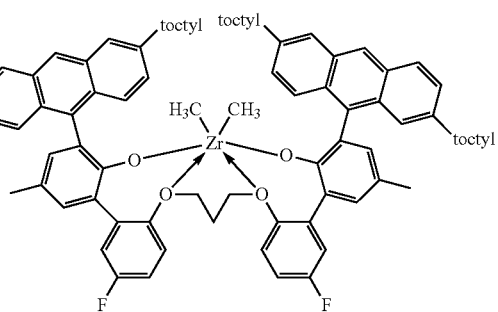

-continued
Procatalyst 15
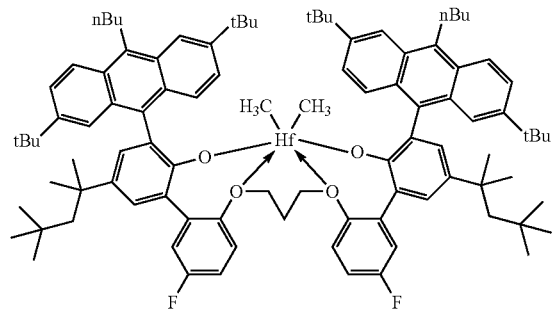
Procatalyst 16
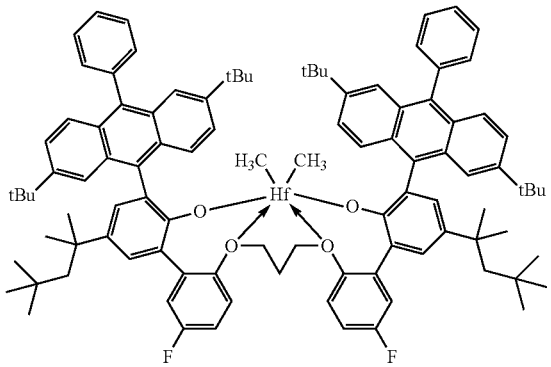
Procatalyst 17
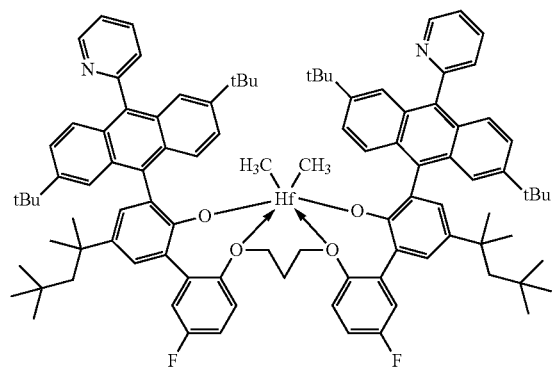
Procatalyst 18
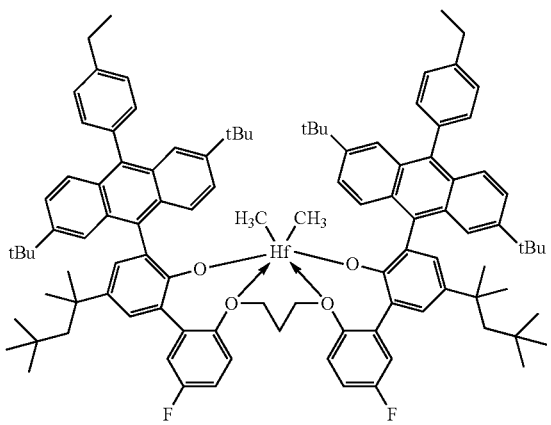
Procatalyst 19
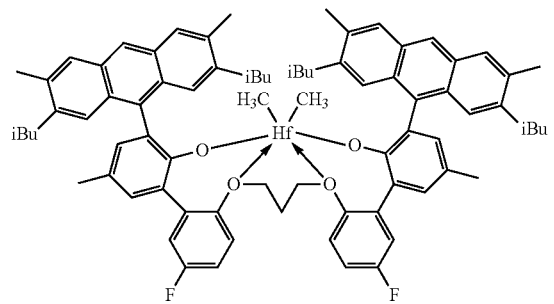
Procatalyst 20
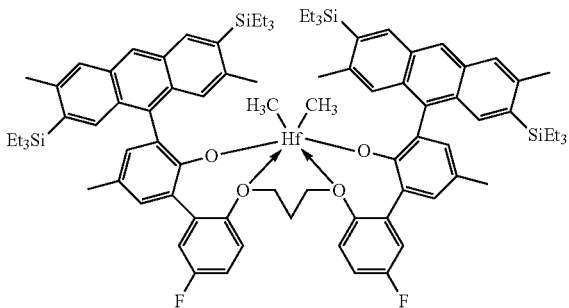
Procatalyst 21
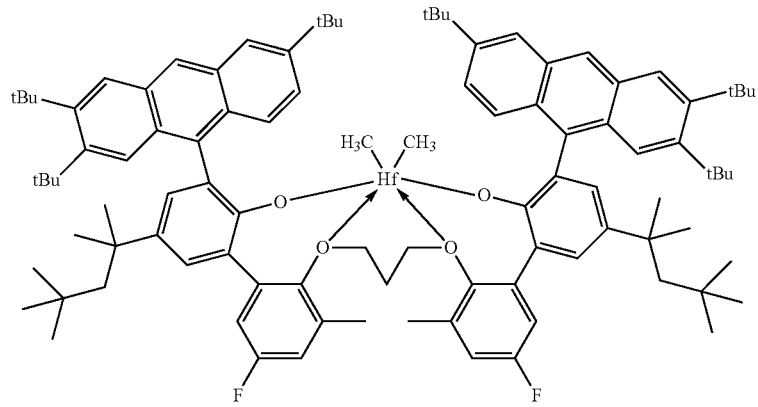

Procatalyst 22

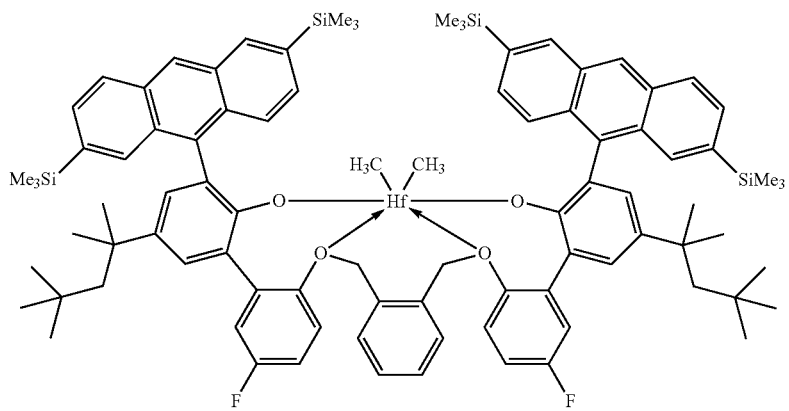

Procatalyst Activation

The catalyst systems of this disclosure include a metal-ligand complex according to formula (I). The metal-ligand complex according to formula. (I) may be in a catalytically active form or in a procatalyst form that is catalytically inactive or is at least substantially less catalytically active than the catalytically active form. The procatalysts 1-4 are catalytically inactive forms of various metal-ligand complexes according to formula (I). The procatalyst system comprising the metal-ligand complex of formula (I) in a procatalyst form may be rendered catalytically active by any technique known in the art for activating metal-based catalysts of olefin polymerization reactions. For example, a metal-ligand complex of formula (I) may be rendered catalytically active by contacting the metal-ligand complex to, or combining the metal-ligand complex with, an activating co-catalyst. Another example of a suitable activating technique includes bulk electrolysis. Combinations of one or more of the foregoing activating co-catalysts and techniques are also contemplated. Subjecting a metal-ligand complex according to formula (I) in a procatalyst form to any of such activating techniques results in a catalytically activated form of the metal-ligand complex according to formula (I). In some embodiments, the catalytically activated form of the metal-ligand complex according to formula (I) may be the result of cleaving at least one X from the procatalyst form of the metal-ligand complex according to formula (I) by any of the foregoing activation techniques.

Cocatalyst Component

The catalyst system comprising a metal-ligand complex of formula (I) may be rendered catalytically active by any technique known in the art for activating metal-based procatalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a methyl, benzyl, or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, tri-isobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2$$^+$, ($C_1$-$C_{20}$)hydrocarbylN(H)$_3$$^+$, or N(H)$_4$+, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group IV metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combining the metal-ligand complex with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis (pentafluorophenyl)borate(I—) amine, and combinations thereof.

In some embodiments of the catalyst system, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in this disclosure may be utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the catalyst systems may produce ethylene-based polymers that include at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 9) to 100 mole percent units derived from ethylene; from 90 to 99.5 mole percent units derived from ethylene; or from 97 to 99.5 mole percent units derived from ethylene.

In some embodiments, the catalyst system produces ethylene-based polymers having an amount of additional α-olefin that is less than 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene.

Any conventional polymerization processes may be employed to produce the ethylene-based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and, optionally, one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.870 g/cm³ to 0.920 g/cm³, from 0.870 g/cm³ to 0.910 g/cm³, or from 0.870 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1.5 to 25, where MWD is defined as $M_w/M_n$ with $M_w$ being a weight-average molecular weight and $M_n$ being a number-average molecular weight. In other embodiments, the polymers resulting from the catalyst system have a MWD from 1.5 to 6. Another embodiment includes a MWD from 1.5 to 3; and other embodiments include MWD from 2 to 2.5.

Embodiments of the catalyst systems described in this disclosure yield unique polymer properties as a result of the high molecular weights of the polymers formed and the amount of the co-monomers incorporated into the polymers.

SymRAD HT-GPC Analysis

The molecular weight data is determined by analysis on a hybrid Robot-Assisted Dilution High-Temperature Gel Permeation Chromatographer (Sym-RAD-GPC) built by Symyx/Dow. The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a *NEXUS* 670 E.S.P. FT-IR.

Batch Reactor Polymerization Procedure (Table 1)

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

Batch Reactor Polymerization Procedure (Table 2)

The batch reactor polymerization reactions according to Procedure B are conducted in a one gallon (3.79 L), stirred autoclave reactor that is charged with ca. 1.35 kg of Isopar™ E mixed alkanes solvent and 1-octene (250 g). The reactor is then heated to the desired temperature and charged with hydrogen (if desired), followed by an amount of ethylene to bring the total pressure to ca. 450 psig (2.95 MPa). The ethylene feed was passed through an additional purification column prior to entering the reactor. The catalyst composition was prepared in a drybox, under inert atmosphere, by mixing the desired pro-catalyst and a cocatalyst (a mixture of 1.2 equiv of tetrakis(pentafluorophenyl)borate(1−) amine, and 50 equiv of triisobutylaluminum modified alumoxane (MMAO-3A)), with additional solvent, to give a total volume of about 17 mL. The activated catalyst mixture was then quick-injected into the reactor. The reactor pressure and temperature were kept constant, by feeding ethylene during the polymerization, and cooling the reactor as needed. After 10 minutes, the ethylene feed was shut off, and the solution transferred into a nitrogen-purged resin kettle. The polymer was thoroughly dried in a vacuum oven, and the reactor was thoroughly rinsed with hot Isopar™ E between polymerization runs.

EXAMPLES

Examples 1 to 31 are synthetic procedures for intermediates of ligands, for ligands themselves, and for isolated procatalysts including the ligands. Example 32 describes polymerization results obtained from metal-ligand complexes prepared according to Examples 1-31. It should be understood that Examples 1-32 are provided to illustrate embodiments described in this disclosure and are not intended to limit the scope of this disclosure or its appended claims.

Example 1

Synthesis of Comparative Procatalyst C1

Preparation of 2-bromo-4-(2,4,4-trimethylpentan-2-yl)phenol

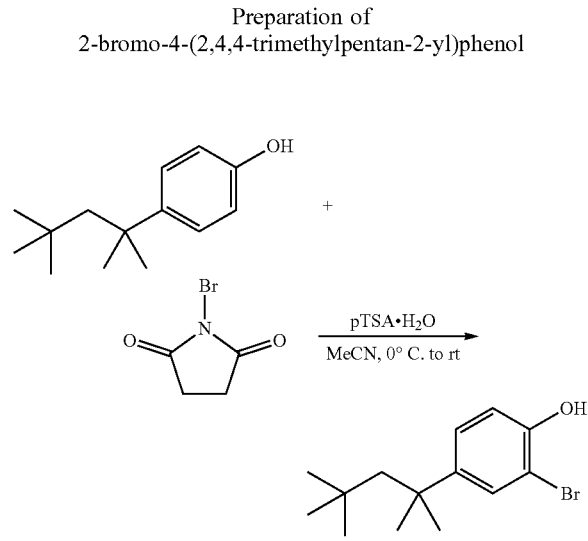

In a 2-L three neck flask equipped with an overhead stirrer, a thermometer probe, and a nitrogen flow was added 4-(2,4,4-trimethylpentan-2-yl)phenol (108.3 g, 525 mmol), pTSA·H$_2$O (99.9 g, 525 mmol), and acetonitrile (900 mL). The mixture was stirred at ambient temperature for 18 h. The mixture was then cooled to 5° C. and a white suspension formed. NBS (98.4 g, 525 mmol) was then added in 20 g portions. The temperature gradually rose from 5° C. to 9° C. After complete addition of NBS the cooling bath was removed and the white suspension allowed to warm to ambient temperature. The reaction was allowed to stir for 18 h aliquot. An aliquot (quenched with Na$_2$S$_2$O$_3$) showed the reaction was complete. The mixture was quenched with H$_2$O (150 mL) and 20% Na$_2$S$_2$O$_3$ (100 mL). The combined reaction mixture was partially concentrated and MeCN (850 mL) removed. EtOAc (200 mL) was added and the layers separated. The aqueous layer was extracted with EtOAc (2×120 mL). The combined organic layers were washed with H$_2$O (100 mL) and brine (60 mL). The organic layers was passed via a SiO$_2$ plug (20 g) and rinsed with EtOAc (50 mL). The solvent was removed by rotary evaporation to give a pale yellow crude oil weighing 150.9 g (100%). $^1$H NMR and $^{13}$C NMR showed material was pure. Material used as is in the next step.

$^1$H NMR (400 MHz, CDCl$_3$) δ 7.41 (d, J=2.4 Hz, 1H), 7.21 (dd, J=8.8, 2.4 Hz, 1H), 6.93 (d, J=8.4 Hz, 1H), 6.89 (dd, J=9.6, 4.8 Hz, 2H), 1.68 (s, 2H), 1.32 (s, 6H), 0.73 (s, 9H). $^{13}$C NMR (100.6 MHz, CDCl$_3$) δ 149.7, 144.2, 129.5, 127.0, 115.3, 109.7, 56.9, 38.1, 32.3, 31.8, 31.5, 29.5.

Example 2

Synthesis of 2-(4,4,5,5-tetramethyl-1,3,2-dioxaborolan-2-yl)-4-(2,4,4-trimethylpentan-2-yl)phenol

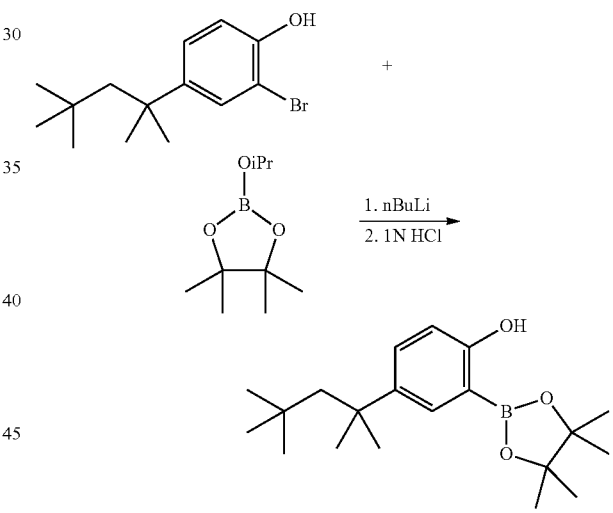

In a 1-L four-neck round bottom flask equipped with a stirrer, a thermometer, and a nitrogen pad, 2-bromo-4-(2,4,4-trimethylpentan-2-yl)phenol was added (45.7 g, 160 mmol) and anhydrous diethyl ether (200 mL). The mixture was cooled to −70° C. in a dry-ice acetone bath. At −50° C. the solution became a suspension. A solution of 2.5 M BuLi in hexane (147 mL, 368 mmol) was added dropwise while maintaining the reaction temperature below −60° C. The reaction became clear after adding nBuLi (50 mL). The mixture was let stir at −70 C for 1 h and the cooling bath was removed. The resulting clear mixture was allowed to warm to ambient temperature and stirred for an hour at ambient temperature. Analysis of 1-h aliquot by GC/MS showed all the starting material had been consumed. The reaction mixture was cooled in the dry-ice acetone bath to −70° C. and 2-isopropoxy-4,4,5,5-tetramethyl-1,3,2-dioxaborolane (55.5 mL, 272 mmol) was added slowly while maintaining the reaction temperature below −58° C. The reaction was then let warm up to ambient temperature overnight. After overnight of stirring the reaction mixture was found to have formed a white solid. Water (200 mL) and EtOAc (200 mL) were then added and pH was adjusted to pH 7-8 using 1 N HCl. The layers were separated and the aqueous layer extracted with EtOAc (2×100 mL). The organic layers were washed with brine (1×60 mL) the solvent was removed by a rotary evaporator to afford a crude brown viscous oil material that was used as in the next reaction. Assumed an active yield of 47.9 g (90%).

$^1$H NMR (400 MHz, CDCl$_3$) δ 7.73 (s, 1H), 7.54 (d, J=2.4 Hz, 1H), 7.38 (dd, J=8.4, 2.4 Hz, 1H), 6.80 (d, J=8.4 Hz, 1H), 1.70 (s, 2H), 1.37-1.35 (m, 18H), 0.73 (s, 9H). $^{13}$C NMR (100.6 MHz, CDCl$_3$) δ 161.4, 140.9, 132.5, 132.0, 114.7, 84.3, 56.9, 37.9, 32.3, 31.8, 31.6, 24.8.

Example 3

Preparation of 6',6'''-(propane-1,3-diylbis(oxy))bis(3' fluoro-5-(2,4,4-trimethylpentan-2-yl)-[1,1'-biphenyl]-2-ol)

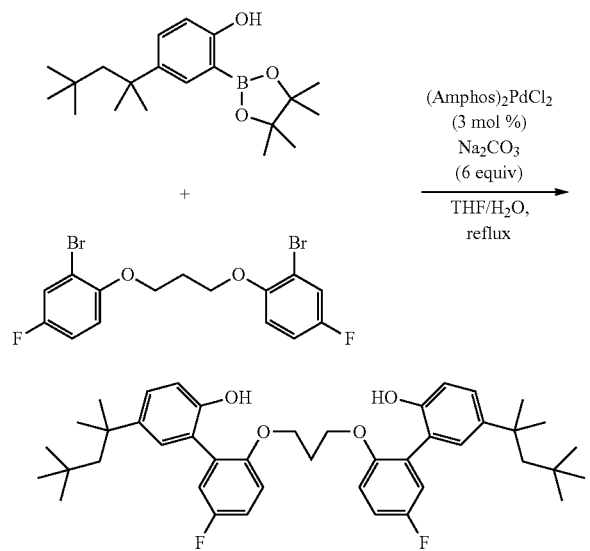

In a 1 L four-neck round bottom flask equipped with an overhead stirrer, a thermometer probe, a condenser, and a nitrogen pad was added 1,3-bis(2-bromo-4-fluorophenoxy) propane (22.4 g, 53.1 mmol), THF (125 mL), 2-(4,4,5,5-tetramethyl-1,3,2-dioxaborolan-2-yl)-4-(2,4,4-trimethyl-pentan-2-yl)phenol (20.3 g, 61.1 mmol), aqueous Na$_2$CO$_3$ (16.9 g, 159.3 mmol) dissolved in water (63 mL). Nitrogen was purged through the stirred solution for 20 min to ensure complete degassing then the catalyst (Amphos)$_2$PdCl$_2$ (565 mg, 0.8 mmol) was added. The resulting yellow solution was sparged for 20 min then the mixture was heated to reflux (68° C.) for 18 h. Analysis by HPLC of 18-h aliquot showed all the starting material had been fully consumed. The reaction mixture was allowed to cool to ambient temperature and was diluted with EtAOc (100 mL) and water (60 mL). The layers were separated and the aqueous layer was extracted with EtOAc (2×60 mL). The organic layer was removed to give a dark colored oil. To the oil was added EtOAc (100 mL) and SiO$_2$ (65 g). The solvent was removed in vacuo to afford a brown colored silica-gel impregnated crude product. The crude was purified by CombiFlash (330 g column, hex/EtOAc (100/0 then gradient to 95/5, hold at 95/5 then gradient 80/20)). The separation was very poor. First pass attempt gave a purity of 79.2%. The material was purified again to afford a brown oil weighing 13.1 g (73%) with a purity of >98%. The edges that were contaminated were purified again to afford 1.01 g (6%) of product plus another contaminated product. A total of 14.1 g (79%) of pure 6',6'''-(propane-1,3-diylbis(oxy))bis(3'-fluoro-5-(2,4,4-trimethylpentan-2-yl)-[1,1'-biphenyl]-2-01) was isolated. The contaminated material was set aside and purified with other batches later.

$^1$H NMR (400 MHz, CDCl$_3$) δ 7.27 (dd, J=8.8, 2.4 Hz, 4H), 7.14 (d, J=2.4 Hz, 2H), 7.04-6.99 (m, 3H), 6.89-6.84 (m, 3H), 5.98 (s, 2H), 3.96 (t, J=7.0 Hz, 4H), 1.70 (s, 4H), 1.35 (s, 8H), 0.71 (s, 12H). $^{19}$F NMR (376.5 MHz, CDCl$_3$) δ −121.1. $^{13}$C NMR (100.6 MHz, CDCl$_3$) δ 159.2, 156.8, 151.0 (d, $J_{F-C}$=56.7 Hz), 142.5, 130.2 (d, $J_{F-C}$=28.1 Hz), 128.8, 127.5, 124.2 (d, $J_{F-C}$=4.1 Hz), 118.6 (d, $J_{F-C}$=86.3 Hz), 116.7, 115.3 (d, $J_{F-C}$=26.3 Hz), 115.2 (d, $J_{F-C}$=79.9 Hz), 66.8, 57.1, 38.0, 32.3, 31.8, 31.6, 28.9. HRMS Calcd. for C$_{43}$H$_{54}$F$_2$O$_4$ [M]$^+$: 672.39902. Found [M−H]+: 671.3956.

Example 4

Preparation of 6',6'''-(propane-1,3-diylbis(oxy))bis(3' fluoro-3-iodo-5-(2,4,4-trimethylpentan-2-yl)-[1,1'-biphenyl]-2-ol)

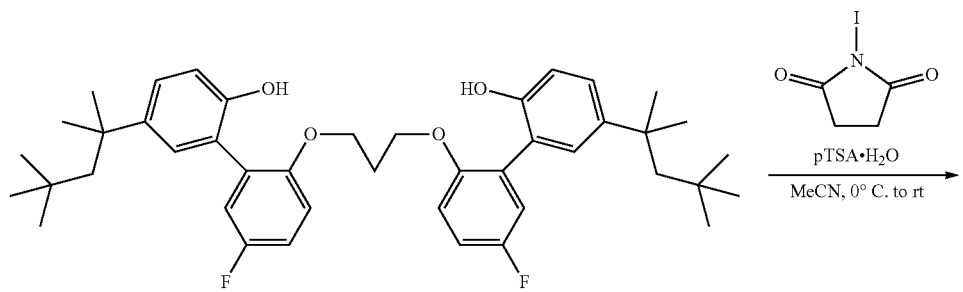

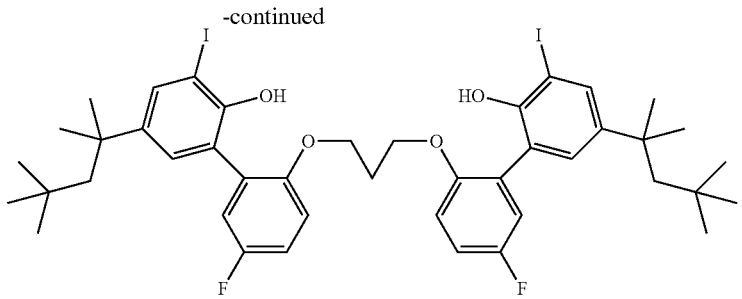

In a 250 mL four neck round bottom flask was placed 6',6'''-(propane-1,3-diylbis(oxy))bis(3'-fluoro-5-(2,4,4-trimethylpentan-2-yl)-[1,1'-biphenyl]-2-ol) (13.5 g, 20.1 mmol), MeCN (150 mL), and pTSA (8.78 g, 46.2 mmol). The mixture was stirred under $N_2$ stream until all the solids dissolved. The solution was then cooled to 5° C. in ice/water bath and covered with an aluminum foil. To the solution was added two equal portions of NIS (10.4 g, 46.2 mmol). The solution was then allowed to stir for 15 h. 15 h aliquot showed the reaction was complete. The reaction was stopped and quenched. To the crude was added 20% $Na_2S_2O_3$ (30 mL) and water (30 mL). The mixture was extracted with EtOAc (4×80 mL). The combined organic layers were washed with brine (40 mL) and concentrated to give a red-brown crude weighing 23.2 g. The crude was dissolved in EtOAc (60 mL) and $SiO_2$ (54 g) added. The solvent was removed in vacuo and purified by CombiFlash (330 g column, hexanes/EtOAc eluent) to afford, after cutting contaminated fractions a solid weighing 12.2 g (65%) that by HPLC analysis was 98.5% pure. The contaminated fractions were purified again to afford 3.18 g (17%) pure material and contaminated edges again. Total isolated yield 15.4 g (82%).

$^1$H NMR (400 MHz, CDCl$_3$) δ 7.69 (d, J=2.0 Hz, 2H), 7.12 (d, J=2.0 Hz, 2H), 7.59 (dt, J=8.4, 3.2 Hz, 2H), 6.97-6.90 (m, 4H), 6.20 (s, 2H), 3.96 (t, J=7.0 Hz, 4H), 1.98 (q, J=7 Hz, 2H), 1.67 (s, 4H), 1.32 (s, 12H), 0.73 (s, 18H). $^{13}$C NMR (100.6 MHz, CDCl$_3$) δ 158.8, 156.4, 151.0, 150.0, 144.4, 136.7, 129.6, 129.2 (d, $J_{F-C}$=28.5 Hz), 124.2 (d, $J_{F-C}$=7.5 Hz), 118.4 (d, $J_{F-C}$=86.6 Hz), 115.7 (d, $J_{F-C}$=85.5 Hz), 114.9 (d, $J_{F-C}$=31.9 Hz), 85.9, 66.3, 57.0, 38.0, 32.4, 31.8, 31.5, 28.9. HRMS Calcd. for $C_{43}H_{52}F_2I_2O_4$ [M]+: 924.19230. Found [M−H]$^+$: 923.1881.

Example 5

Preparation of 6',6''-(propane-1,3-diylbis(oxy))bis(3-(anthracen-9-yl)-3' fluoro-5-(2,4,4-trimethylpentan-2-yl)-[1,1'-biphenyl]-2-ol)

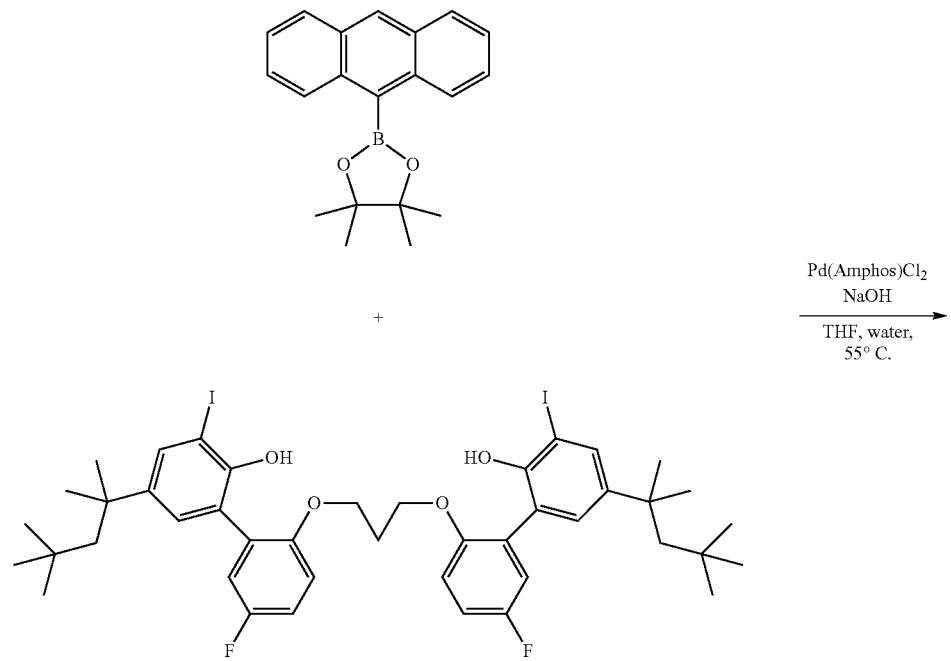

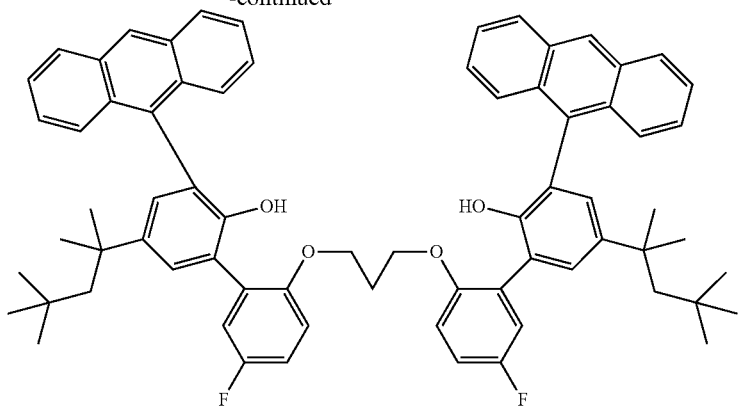

In a glovebox, a 100 mL round bottom flask was charged with the 6',6'''-(propane-1,3-diylbis(oxy))bis(3'-fluoro-3-iodo-5-(2,4,4-trimethylpentan-2-yl)-[1,1'-biphenyl]-2-ol) [11](2.04 g, 2.21 mmol, 1.00 equiv.), anthracen-9-ylboronic acid (1.18 g, 5.30 mmol, 2.40 equiv.), Pd(AmPhos)Cl$_2$ (78 mg, 0.11 mmol, 5.0 mol %), and 34 mL of dry, degassed THF. The flask was attached to a reflux condenser, was sealed and was removed from the glovebox. Aqueous sodium hydroxide (1.34 M, 8.22 mL, 11.0 mmol, 5.00 equiv.) was added, and the mixture was heated to 55° C. After 14 hours, the solution was cooled and quenched with water. pH was adjusted to ~7 and product was extracted with several portions of dichloromethane. Combined organic fractions were dried with Na$_2$SO$_4$, filtered, concentrated, and the residue purified by chromatography on silica gel (0 to 100% EtOAc in hexanes). Product isolated from chromatography was dissolved in a minimal amount of hot ethyl acetate, and precipitated with addition of hexanes. After cooling overnight, the white solid precipitate was collected by filtration and dried in a vacuum oven (1.49 g, 63% yield).

$^1$H NMR (500 MHz, CDCl$_3$) δ 8.56 (s, 2H), 8.08 (d, J=8.5 Hz, 4H), 7.64 (d, J=8.8 Hz, 4H), 7.48-7.39 (m, 4H), 7.33-7.27 (m, 6H), 7.03 (dd, J=8.9, 3.2 Hz, 2H), 6.49 (td, J=8.4, 3.1 Hz, 2H), 5.88 (dd, J=9.2, 4.5 Hz, 2H), 5.21 (s, 2H), 3.74 (t, J=5.6 Hz, 4H), 1.93 (q, J=5.7 Hz, 2H), 1.70 (s, 4H), 1.36 (s, 12H), 0.79 (s, 18H). $^{13}$C NMR (126 MHz, CDCl$_3$) δ 157.14 (d, J=239.8 Hz), 151.06 (d, J=2.1 Hz), 149.14, 141.93, 133.31, 131.56, 130.62, 130.20, 128.93 (d, J=6.6 Hz), 128.91, 128.49, 126.79, 126.53, 125.41, 125.21, 125.02, 124.69, 118.36 (d, J=23.1 Hz), 114.72 (d, J=22.8 Hz), 112.73 (d, J=8.4 Hz), 65.27, 57.16, 38.10, 32.44, 31.91, 31.71, 29.05. $^{19}$F NMR (470 MHz, CDCl$_3$) δ −122.95 (q, J=7.4 Hz). HRMS (ESI): m/z Calcd. for C$_{71}$H$_{70}$F$_2$NaO$_4$ [M+Na]$^+$1047.514, found 1047.514

Example 6

Preparation of Comparative Procatalyst C1

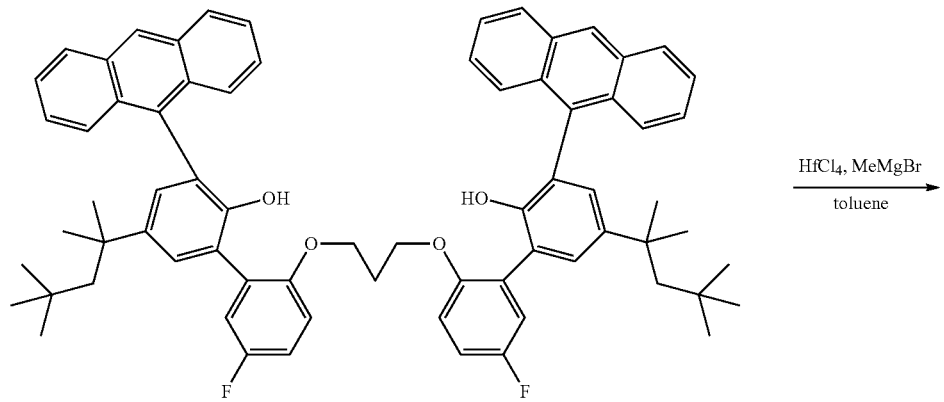

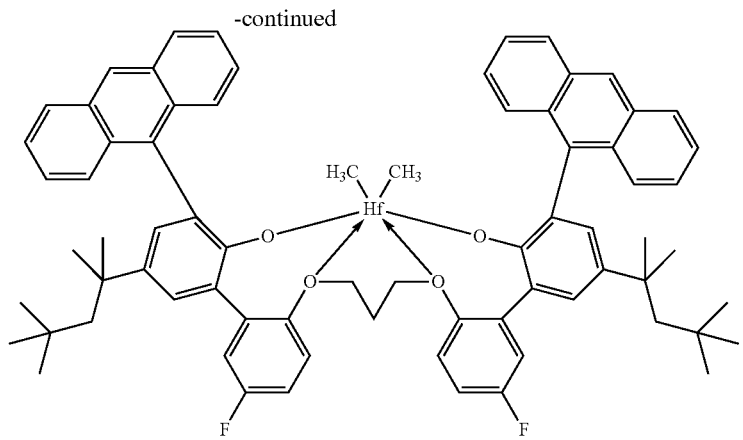

In a glovebox, a 60 mL jar was charged with hafnium tetrachloride (67 mg, 0.210 mmol, 1.05 equiv.) and toluene (18 mL). The mixture was cooled in a freezer (−25° C.) for 90 minutes, then methylmagnesium bromide (3.0 M in diethyl ether, 0.30 mL, 0.90 mmol, 4.5 equiv.) was added at once with vigorous stirring. After 2 minutes, the ligand 6′,6′′′-(propane-1,3-diylbis(oxy))bis(3-(anthracen-9-yl)-3′-fluoro-5-(2,4,4-trimethylpentan-2-yl)-[1,1′-biphenyl]-2-ol) (0.205 g, 0.200 mmol, 1.00 equiv.) was added at once and the mixture was stirred vigorously. After 3 hours, 15 mL hexane was added. The slurry was filtered and the filtrate was concentrated to a grey solid. The solid was re-dissolved in ~20 mL of 1:1 toluene:hexane. Most solids dissolved. The solution was filtered through a 0.45 μm syringe filter and concentrated again. Product was isolated as a white solid (0.2273 g, 92%).

$^1$H NMR (500 MHz, C$_6$D$_6$) δ 8.33-8.25 (m, 4H), 8.17 (d, J=8.9 Hz, 2H), 8.01-7.94 (m, 2H), 7.80 (d, J=8.4 Hz, 2H), 7.58 (d, J=2.5 Hz, 2H), 7.42 (d, J=2.5 Hz, 2H), 7.34-7.26 (m, 4H), 7.15-7.11 (m, 2H), 7.11-7.01 (m, 4H), 6.48 (ddd, J=8.9, 7.2, 3.2 Hz, 2H), 4.23 (dd, J=8.9, 5.1 Hz, 2H), 3.69 (dt, J=10.3, 5.2 Hz, 2H), 3.07 (dt, J=10.6, 5.5 Hz, 2H), 1.62 (s, 4H), 1.32 (s, 6H), 1.29 (s, 6H), 1.13 (p, J=5.4 Hz, 2H), 0.84 (s, 18H), −1.52 (s, 6H). $^{13}$C NMR (126 MHz, C$_6$D$_6$) δ 160.29 (d, J=245.5 Hz), 156.81, 150.72 (d, J=2.7 Hz), 139.86, 135.55, 135.34 (d, J=8.1 Hz), 132.22, 132.02, 131.98, 131.35, 130.27, 129.21, 128.47, 128.26, 128.19, 127.98, 126.68, 126.56, 125.76, 124.74 (d, J=8.8 Hz), 124.57, 124.47, 118.29 (d, J=23.3 Hz), 114.86 (d, J=22.7 Hz), 76.41, 56.84, 47.68, 37.82, 32.23 (2), 31.79, 30.95, 29.29. $^{19}$F NMR (470 MHz, C$_6$D$_6$) δ-115.51 (m).

Example 7

Synthesis of Procatalyst 1

Preparation of 2-(2,6-di-tert-butylanthracen-9-yl)-4,4,5,5-tetramethyl-1,3,2-dioxaborolane

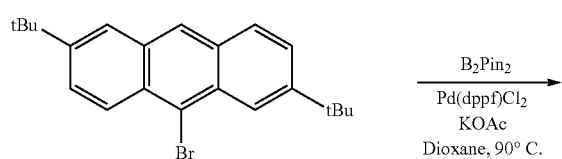

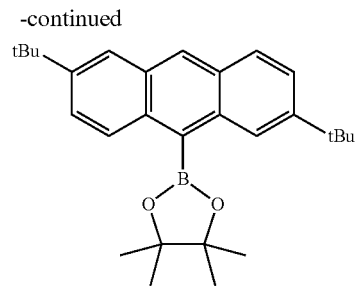

A 100 mL round bottom flask was charged with 9-bromo-2,6-di-tert-butylanthracene (4.04 g, 10.9 mmol, 1.00 equiv.), bis(pinacolato)diboron (3.33 g, 13.1 mmol, 1.20 equiv), KOAc (3.22 g, 32.8 mmol, 3.00 equiv.), and Pd(dppf)Cl$_2$ (0.160 g, 0.219 mmol, 2.00 mol %). The flask was connected to a reflux condenser and purged with nitrogen. 37 mL of dry, nitrogen-sparged dioxane was added, and the mixture was stirred at 90° C. for 48 hours. The solution was cooled and quenched with saturated aqueous NH$_4$Cl. Product was extracted with several portions of dichloromethane. Combined organic fractions were dried with MgSO$_4$, concentrated, and chromatographed on silica gel (0 to 5% ethyl acetate in hexanes). Product was isolated as a yellow oil (1.60 g, 35% yield).

$^1$H NMR (400 MHz, CDCl$_3$) δ 8.40-8.31 (m, 3H), 7.90 (d, J=8.9 Hz, 1H), 7.83 (d, J=2.0 Hz, 1H), 7.57 (dd, J=9.3, 2.1 Hz, 1H), 7.51 (dd, J=8.9, 1.9 Hz, 1H), 1.57 (s, 12H), 1.44 (s, 9H), 1.43 (s, 9H). $^{13}$C NMR (101 MHz, CDCl$_3$) δ 147.32, 146.60, 135.78, 134.70, 130.97, 129.86, 128.61, 128.22, 127.82, 125.26, 124.27, 122.83, 122.71, 84.12, 35.26, 34.73, 30.98, 30.91, 25.25.

Example 8
Preparation of 2',2'''-(propane-1,3-diylbis(oxy))bis(3-(2,6-di-tert-butylanthracen-9-yl)-5'-fluoro-3'-methyl-5-(2,4,4-trimethylpentan-2-yl)-[1,1'-biphenyl]-2-ol)
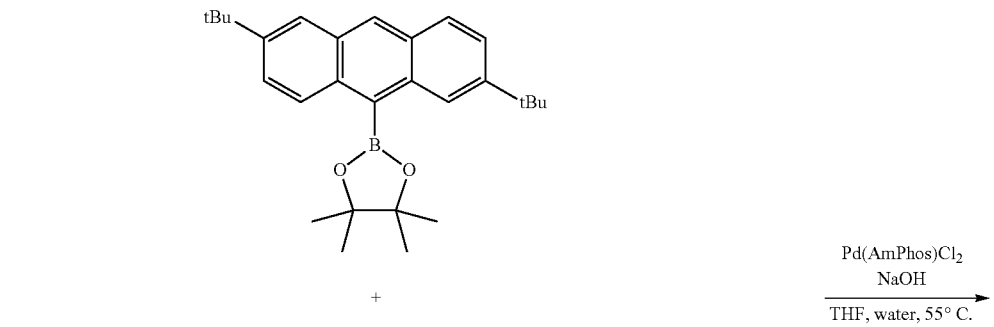
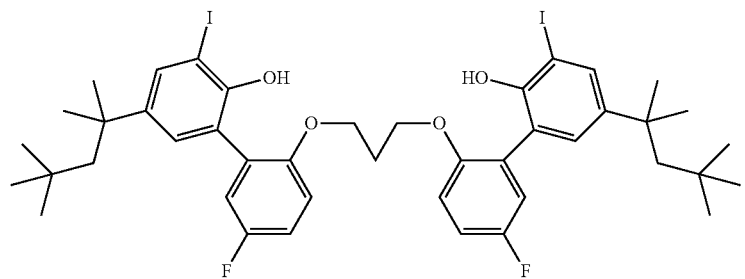
$\xrightarrow[\text{THF, water, 55° C.}]{\text{Pd(AmPhos)Cl}_2 \ \text{NaOH}}$
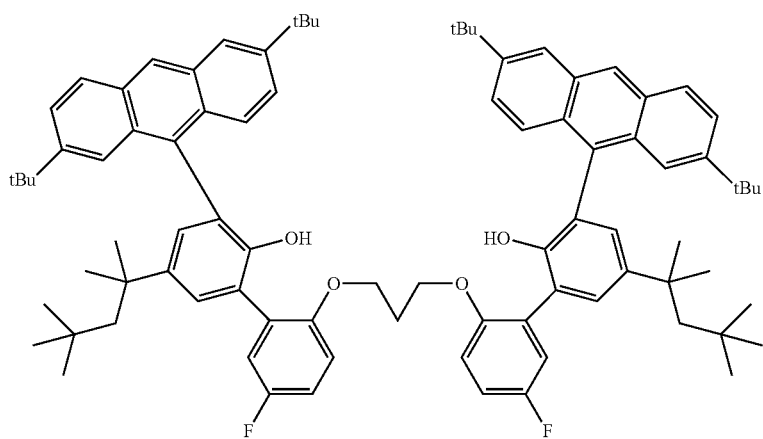
L1

In a glovebox, a 250 mL round bottom flask was charged with 6',6'''-(propane-1,3-diylbis(oxy))bis(3'-fluoro-3-iodo-5-(2,4,4-trimethylpentan-2-yl)-[1,1'-biphenyl]-2-ol) (1.02 g, 1.10 mmol, 1.00 equivalent), 2-(2,6-di-tert-butylanthracen-9-yl)-4,4,5,5-tetramethyl-1,3,2-dioxaborolane (1.10 g, 2.65 mmol, 2.40 equivalents), Pd(Amphos)Cl$_2$ (39 mg, 0.055 mmol, 5.0 mol %), and 17 mL dry, degassed THF. The flask was attached to a reflux condenser, was sealed, and was removed from the glovebox. Aqueous sodium hydroxide (1.342 M, 4.11 mL, 5.52 mmol, 5.00 equivalents) was added to the flask, and the resulting mixture was heated to 55° C. After 14 hours, the mixture was cooled and quenched with saturated aqueous NH$_4$Cl. The final product was extracted with several portions of dichloromethane. The organic fractions were combined and dried with Na$_2$SO$_4$, filtered, and concentrated. The crude residue was purified by chromatography on silica gel (0 to 10% ethyl acetate in hexanes). The product obtained from chromatography possessed a few impurities. The solid was suspended in 100 mL ethanol, and boiled for 30 minutes. The solution was cooled. A clean, white solid was isolated by filtration. The solid was dried in a vacuum oven to give ligand L1 as a white solid (0.6002 g, 44% yield).

$^1$H NMR (400 MHz, CDCl$_3$) δ 8.50 (s, 2H), 8.03 (d, J=8.8 Hz, 2H), 7.97 (d, J=1.8 Hz, 2H), 7.60-7.46 (m, 6H), 7.39 (dt, J=9.2, 2.2 Hz, 2H), 7.24 (d, J=3.4 Hz, 4H), 6.92 (dd, J=8.9, 3.2 Hz, 2H), 6.24 (td, J=8.6, 8.2, 3.1 Hz, 2H), 5.41 (ddd, J=14.7, 8.9, 4.5 Hz, 2H), 4.84 (d, J=1.3 Hz, 2H), 3.60 (q, J=5.0 Hz, 4H), 1.94-1.79 (m, 2H), 1.74 (d, J=14.5 Hz, 2H), 1.66 (d, J=14.5 Hz, 2H), 1.41 (d, J=2.6 Hz, 18H), 1.35 (d, J=6.7 Hz, 12H), 1.24 (d, J=4.1 Hz, 18H), 0.79 (s, 18H). $^{13}$C NMR (101 MHz, CDCl$_3$) δ 156.73 (d, J=238.8 Hz), 151.20 (d, J=3.0 Hz), 148.96, 147.58, 147.56, 147.26, 141.72, 131.95 (d, J=4.5 Hz), 131.36, 130.44, 129.74, 129.38, 128.77, 128.70, 128.64, 128.05, 126.15, 126.12, 124.99, 124.76, 124.51, 122.62, 120.44, 118.07 (d, J=23.1 Hz), 114.41 (d, J=23.0 Hz), 111.90 (d, J=14.1 Hz), 109.99, 64.52, 64.46, 56.92, 38.08, 34.98, 34.81, 32.54, 32.47, 31.99, 31.21, 30.94, 30.86. $^{19}$F NMR (376 MHz, CDCl$_3$) δ −123.81−−124.02 (m).

Example 9

Preparation of Procatalyst 1

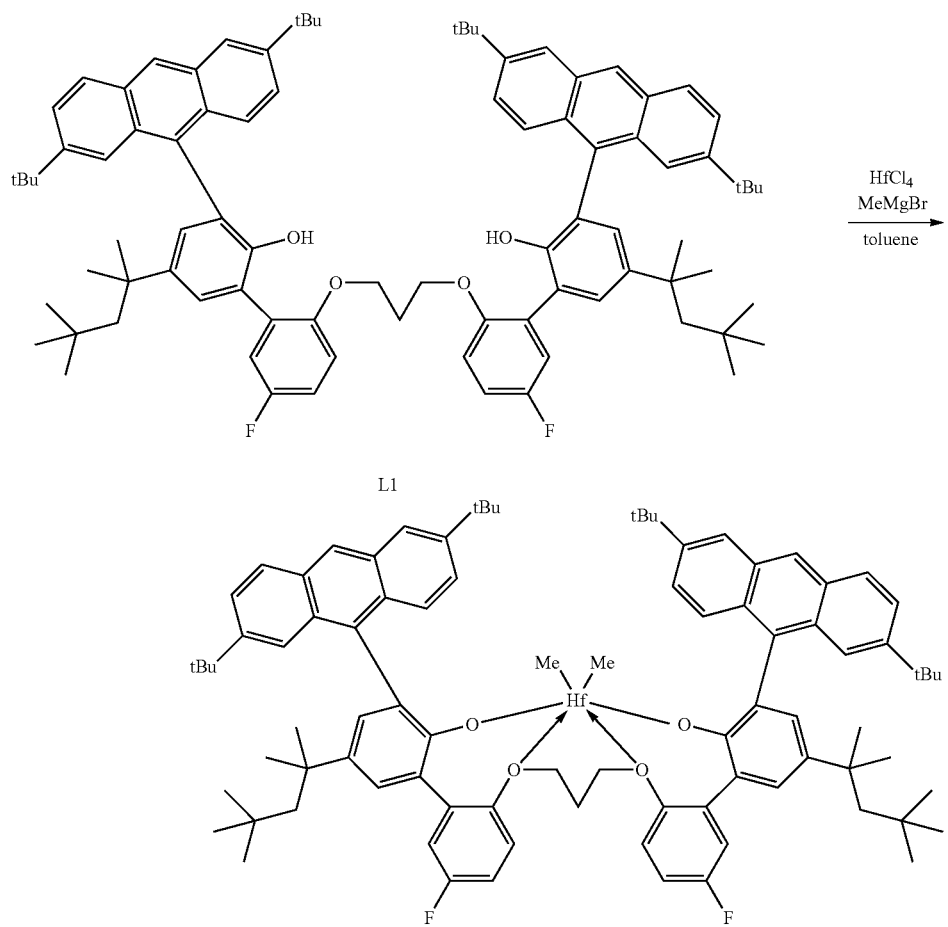

Procatalyst 1

In a glovebox, a 60 mL jar was charged with hafnium tetrachloride (67 mg, 0.210 mmol, 1.05 equivalents) and toluene (18 mL). The mixture was cooled in a freezer (−25° C.) for 90 minutes, then methylmagnesium bromide (3.0 M in diethyl ether, 0.30 mL, 0.90 mmol, 4.5 equivalent) was added at once with vigorous stirring. After two minutes, the ligand L1 prepared in Example 1 (0.250 g, 0.200 mmol, 1.00 equivalents) was immediately added to the hafnium tetrachloride mixture, and the mixture was stirred vigorously. After 3 hours, hexane (20 mL) was added to the mixture, and the slurry was filtered through a 0.45 μm syringe filter. The filtrate was concentrated to a pale brown residue. The material was suspended in approximately 6 mL hexanes and filtered again. The filtrate was concentrated to give the product as 0.2562 g of an off-white solid, a 88% yield of Procatalyst 1. The NMR of the solid indicated that the product had a mixture of rotational isomers.

$^1$H NMR (400 MHz, Toluene-$d_8$) δ 8.30 (d, J=3.7 Hz, 3H), 8.20 (d, J=9.3 Hz, 1H), 8.07 (s, 1H), 8.04-7.93 (m, 3H), 7.89-7.77 (m, 2H), 7.63-7.35 (m, 8H), 7.20 (m, 2H), 6.62-6.41 (m, 2H), 4.42 (m, 2H), 4.06-3.65 (m, 2H), 3.48-3.03 (m, 2H), 1.71-0.70 (m, 76H), --1.51--1.97 (2×s, 6H). $^{19}$F NMR (376 MHz, Toluene-$d_8$) δ-115.58 (td, J=16.2, 8.3 Hz).

Example 10

Synthesis of Procatalyst 2

Preparation of 1-(methoxymethoxy)-4-(2,4,4-trimethylpentan-2-yl)benzene

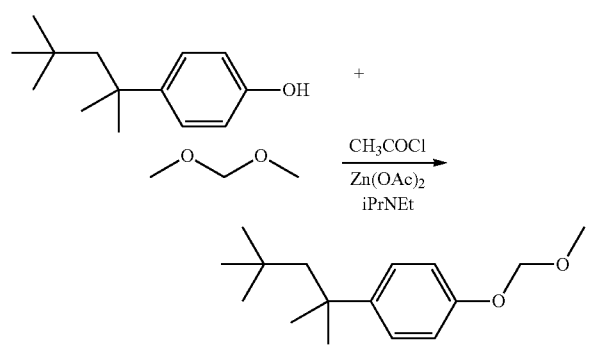

A 500-mL three-neck flask fitted with a thermocouple, a reflux condenser, and a nitrogen pad was charged with dimethoxymethane (44.24 mL, 500 mmol), toluene (130 mL), and Zn(OAc)$_2$ (9.2 mg, 0.01 mol %). Acetyl chloride (35.5 mL, 500 mmol) was added through a syringe over 5 min. An exothermic reaction was observed: the temperature gradually rose to 37° C. over the next 10 min. At this point a cold water bath was applied to cool the reaction. When the temperature dropped to 30° C., the cold water bath was removed and the reaction mixture was allowed to stir at ambient temperature for an additional 4 h. 4-(2,4,4-Trimethylpentan-2-yl)phenol (51.58 g, 250 mmol) was added in one portion, followed by addition of iPr$_2$NEt (54.5 mL, 313 mmol) over 5 min. The resulting reaction mixture was stirred at ambient temperature for 1 h (a slightly exothermic reaction was observed at the beginning with about a 5° C. temperature increase), then heated at 60° C. overnight (15 h). An aliquot of the reaction mixture was taken, treated with sat. NH$_4$Cl solution, and extracted with EtOAc. The EtOAc extract was analyzed by HPLC and GC, which indicated the reaction was complete. The reaction mixture was allowed to cool to ambient temperature, then cooled in an ice-water bath, and saturated NH$_4$Cl solution (100 mL) was added at such a rate to maintain the temperature below 30° C. The biphasic reaction mixture was stirred for 1-2 h (to ensure excess MOM-Cl was completely decomposed), then diluted with toluene (100 mL) and water (100 mL). The two phases were separated. The water phase was extracted with toluene (150 mL). The organic phases were combined, washed with water (150 mL×2), filtered through a plug of anhydrous Na$_2$SO$_4$ and concentrated to dryness under reduced pressure using rotary evaporation, which gave the desired product as a colorless oil (62.6 g, 100% yield).

$^1$H-NMR (400 MHz, CDCl$_3$) δ 7.27 (d, J=8.9 Hz, 2H), 6.94 (d, J=8.9 Hz, 2H), 5.15 (s, 2H), 3.48 (s, 3H), 1.70 (s, 2H), 1.34 (s, 6H), 0.72 (s, 9H). $^{13}$C-NMR (111 MHz, CDCl$_3$) δ 154.90, 143.58, 127.06, 115.47, 94.65, 57.01, 55.94, 38.04, 32.33, 31.78, 31.62.

Example 11

Preparation of (2-(methoxymethoxy)-5-(2,4,4-trimethylpentan-2-yl)phenyl)trimethylsilane

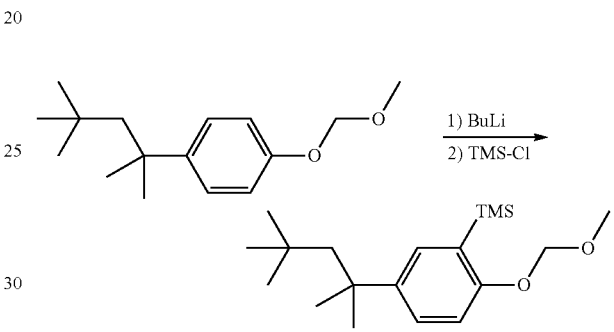

A 1 L three-necked flask equipped with a condenser, an overhead stirrer, a thermometer, and a nitrogen pad was charged with 1-(methoxymethoxy)-4-(2,4,4-trimethylpentan-2-yl)benzene (55.00 g, 220 mmol) and anhydrous THF (300 mL) under nitrogen atmosphere. The mixture was cooled to below –70° C. in a dry ice-acetone bath. A solution of 1.6 M n-BuLi in hexanes (178.5 mL, 286 mmol, 1.3 eq) was added through a syringe over 30 min at –70 to –60° C. The mixture was stirred below –60° C. for 2 hr, the cooling bath was removed to allow the reaction to warm up to ambient temperature for 3 hr. Then the resulting white slurry was cooled to below –70° C., and TMS-C$_1$ (35.80 g, 330 mmol, 1.5 eq) was added over 15 min at –70 to –60° C. The mixture was stirred below –60° C. for 2 hr and then warmed up to room temperature overnight. The reaction slurry was cooled to 0° C.; in a ice-water bath, a solution of sat. NaHCO$_3$ (500 mL) was slowly added. The mixture was stirred for 30 min and then settled for phase separation. The water layer was removed and extracted with EtOAc (300 mL). The combined organic layers were washed with water (500 mL×2), and filtered through a pad of silica gel (20 g). The solvent was removed by rotovap under reduced pressure. The colorless residual oil was dried in vacuum oven under reduced pressure to give the desired product. (70.96 g, 95.1% yield).

$^1$H-NMR (400 MHz, CDCl$_3$) δ 7.33 (d, J=2.6 Hz, 1H), 7.26 (dd, J=2.6 Hz, 8.6 Hz, 1H), 6.93 (d, J=8.6 Hz, 1H), 5.16 (s, 2H), 3.47 (s, 3H), 1.69 (s, 2H), 1.30 (s, 6H), 0.72 (s, 9H), 0.27 (s, 9H).

Example 12

Preparation of (2-(methoxymethoxy)-3-(4,4,5,5-tetramethyl-1,3,2-dioxaborolan-2-yl)-5-(2,4,4-trimethylpentan-2-yl)phenyl)trimethylsilane

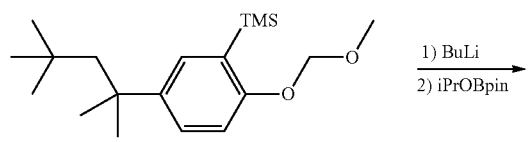

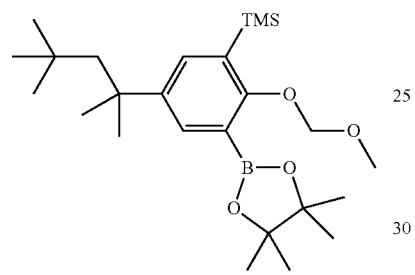

A 1 L three-necked flask equipped with a condenser, an overhead stirrer, a thermometer, and a nitrogen pad was loaded (2-(methoxymethoxy)-5-(2,4,4-trimethylpentan-2-yl)phenyl)trimethylsilane (70.96 g, 220 mmol) and anhydrous THF (300 mL) under nitrogen atmosphere. The mixture was cooled to below −70° C. in a dry ice-acetone bath. A solution of 1.6 M n-BuLi in hexanes (178.5 mL, 286 mmol, 1.3 eq) was added through a syringe over 30 min at −70 to −60° C. The mixture was stirred below −60° C. for 1 h, the cooling bath was removed to allow the reaction to warm up to ambient temperature for 1.5 h. Then the resulting white slurry was cooled to below −70° C., iPrOBin (57.60 g, 310 mmol, 1.4 eq) was added over 30 min at −70 to −60° C. The mixture was stirred below −60° C. for 4 h and then warmed up to ambient temperature overnight. The reaction slurry was cooled to 0° C. in a ice-water bath, a solution of sat. NH₄Cl (400 mL) was slowly added and stirred for 30 min, and then transferred into a separation funnel. EtOAc (400 mL) and water (400 mL) were added and stirred for 30 min, then was settled for phase separation. The water layer was removed. The organic layer was washed with sat. NH₄C₁ (200 mL), water (200 mL), and filtered through a plug of Na₂SO₄ (30 g). The volatiles were evaporated under reduced pressure by rotary evaporation. The residual oil was dried in vacuum oven under reduced pressure to give the desired product, 97.6 g, as a brown oil, which solidified.

$^1$H-NMR (400 MHz, CDCl$_3$) δ 7.66 (d, J=2.7 Hz, 1H), 7.51 (d, J=2.7 Hz, 1H), 5.16 (s, 2H), 3.47 (s, 3H), 1.71 (s, 2H), 1.36 (s, 18H), 0.71 (s, 9H), 0.31 (s, 9H). $^{13}$C-NMR (111 MHz, CDCl$_3$) δ 165.14, 143.43, 136.62, 135.53, 130.51, 100.23, 83.69, 57.63, 57.12, 38.27, 32.45, 31.96, 31.68, 24.96, 0.26.

Example 13

Preparation of 1,3-bis(2-bromo-4 fluoro-6-methylphenoxy)propane

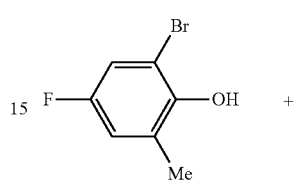

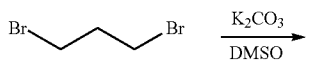

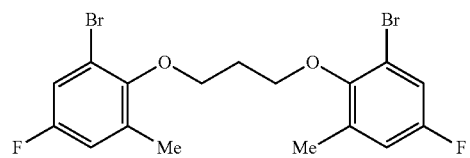

A 500-mL three-necked round bottom flask equipped with a condenser, and a stirrer, a thermometer and a nitrogen pad was loaded with 4-fluoro-2-bromo-4-methylphenol (33.53 g, 164 mmol) and DMSO (150 mL) under nitrogen atmosphere. Powder potassium carbonate (26.95 g, 195 mmol) was added in one portion. The mixture was stirred at ambient temperature for 30 min, then 1,3-dibromopropane (15.75 g, 78 mmol) was added in one shot. The mixture was stirred at ambient temperature overnight (16 h). The resulting mixture was added into 500 mL of water and stirred for 30 min. The precipitate was filtered, rinsed with water (200 mL×2). The wet cake was suction dried, and dried at rt/2 mmHg to give crude product, 32.0 g. The crude was recrystallized from acetonitrile (50 mL) to give the pure product 28.58 g (81.4% yield).

$^1$H-NMR (400 MHz, CDCl$_3$) δ 7.12 (m, 2H), 6.85 (m, 2H), 4.11 (t, J=6.4 Hz, 4H), 2.38 (q, J=6.4 Hz, 2H), 2.34 (s, 6H). $^{13}$C-NMR (111 MHz, CDCl$_3$) δ 159.49, 157.04, 150.91, 134.30, 117.59, 116.96, 70.00, 31.02, 17.06.

Example 14

Preparation of 1,3-bis((5 fluoro-2'-(methoxymethoxy)-3-methyl-5'-(2,4,4-trimethylpentan-2-yl)-3'-(trimethylsilyl)-[1,1'-biphenyl]-2-yl)oxy)propane

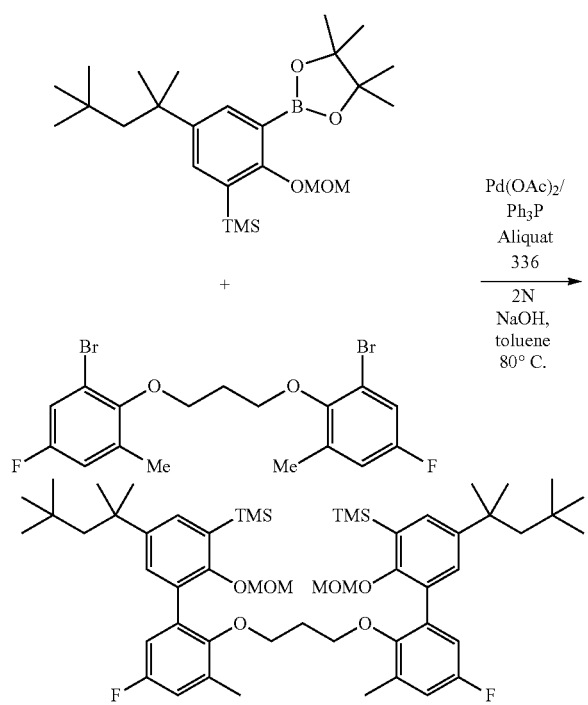

A 125 mL three-neck flask equipped with a stirrer, a condenser, a thermometer, and a nitrogen pad, was added Pd(OAc)₂ (27 mg, 0.12 mmol), Ph₃P (63 mg, 0.24 mmol), Aliquat 336 (24 mg), and degassed toluene (25 mL). The mixture was stirred and purged with nitrogen until all solid disappeared. 1,3-Bis(2-bromo-4-fluoro-6-methylphenoxy)propane (2.701 g, 6.0 mmol) and (2-(methoxymethoxy)-3-(4,4,5,5-tetramethyl-1,3,2-dioxaborolan-2-yl)-5-(2,4,4-trimethylpentan-2-yl)phenyl)trimethylsilane (5.919 g, 13 mmol) were added, followed by adding a solution of 2N NaOH (degassed, 18 mL, 36 mmol) under nitrogen atmosphere. The mixture was then heated and stirred at 80° C. under nitrogen atmosphere overnight. The reaction mixture was cooled to ambient temperature and the water layer was removed and extracted with toluene (2×25 mL). The toluene layers were combined, washed with saturated NaCl solution (2×50 mL), passed through a pad of silica gel (9 g) to afford a light yellow solution. The silica gel wet cake was rinsed with toluene (3×10 mL). The toluene solution was concentrated under reduced pressure to give a yellow oil (8.9 g), which was purified by column chromatography on silica gel to give 4.2 g (75% yield, 99% purity).

$^1$H-NMR (400 MHz, CDCl₃) δ 7.40 (s, 2H), 7.24 (s, 2H), 6.85 (m, 4H), 4.55 (s, 4H), 3.03 (s, 6H), 2.20 (s, 6H), 1.70 (s, 3H), 1.37 (m, 16H), 0.68 (s, 18H), 0.29 (s, 18H).

Example 15

Preparation of 1,3-bis((5-fluoro-3'-iodo-2'-(methoxymethoxy)-3-methyl-5'-(2,4,4-trimethylpentan-2-yl)-[1,1'-biphenyl]-2-yl)oxy)propane

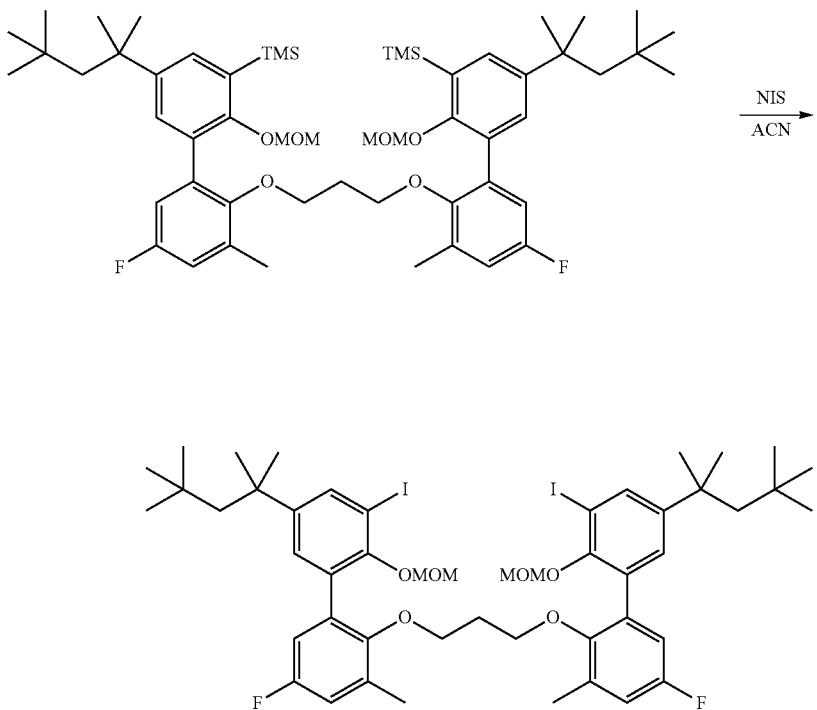

A 1000 mL three-necked flask equipped with a magnetic stirrer, a condenser, and a nitrogen pad was added 1,3-bis((5-fluoro-2'-(methoxymethoxy)-3-methyl-5'-(2,4,4-trimethylpentan-2-yl)-3'-(trimethylsilyl)-[1,1'-biphenyl]-2-yl)oxy)propane (31.0 g, ~95% purity, 33 mmol) and acetonitrile (750 mL) under nitrogen. NIS (44.83 g, 6 eq.) was added in one portion. The reaction mixture was stirred at ambient temperature until the reaction was complete as monitored by HPLC analysis (6.5 h). A solution of 10% of $NaS_2O_3$ (200 mL) was added and stirred for 1 h. The aqueous layer was removed. The organic phase was washed with $Na_2SO_3$ solution until iodine color was disappeared. The organic phase was concentrated under reduced pressure to give an oil residue, which was mixed with hexane (100 mL), and was passed through silica gel column (500 g) to give 23.7 g (72% yield) of desired product.

$^1$H-NMR (400 MHz, $CDCl_3$) δ 7.74 (s, 2H), 7.24 (s, 2H), 6.85 (m, 4H), 4.73 (s, 4H), 3.02 (s, 6H), 2.20 (s, 6H), 1.68 (s, 3H), 1.48 (m, 2H), 1.28 (m, 13H), 0.73 (s, 18H), 0.29 (s, 18H).

Example 16

Preparation of 2-(2,7-di-tert-butylanthracen-9-yl)-4,4,5,5-tetramethyl-1,3,2-dioxaborolane

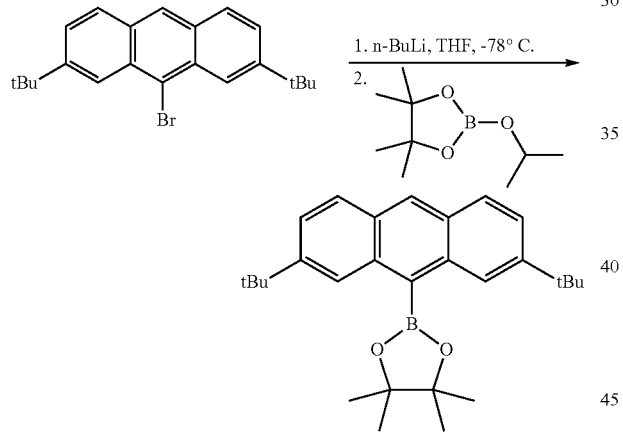

A 250 mL round bottom flask was charged with 9-bromo-2,7-di-tert-butylanthracene (0.860 g, 2.33 mmol, 1.00 equiv.) and 12 mL dry THF. The flask was cooled to −78° C. under a blanket of nitrogen with stirring. N-butyllithium (2.5 M in hexane, 1.03 mL, 2.56 mmol, 1.10 equiv) was added to the cooled solution. After 30 minutes, 2-isopropoxy-4,4,5,5-tetramethyl-1,3,2-dioxaborolane (0.57 mL, 2.8 mmol, 1.2 equiv.) was added. The mixture warmed to room temperature gradually over 1 hour and was quenched with saturated aqueous $NH_4Cl$. The product was extracted with portions of dichloromethane and combined organic fractions were concentrated and purified by chromatography on silica gel (0 to 30% EtOAc in hexanes). Product was isolated as a white solid (0.911 g, 94%).

$^1$H NMR (400 MHz, $CDCl_3$) δ 8.34 (s, 1H), 8.29 (s, 2H), 7.90 (d, J=8.9 Hz, 2H), 7.51 (dd, J=8.9, 1.4 Hz, 2H), 1.59 (s, 12H), 1.44 (s, 18H). $^{13}$C NMR (101 MHz, $CDCl_3$) δ 147.45, 136.14, 129.45, 128.28, 128.03, 124.08, 122.62, 84.06, 35.27, 31.01, 25.36.

Example 17

Preparation of 2',2'''-(propane-1,3-diylbis(oxy))bis(3-(2,7-di-tert-butylanthracen-9-yl)-5'-fluoro-3'-methyl-5-(2,4,4-trimethylpentan-2-yl)-[1,1'-biphenyl]-2-ol)

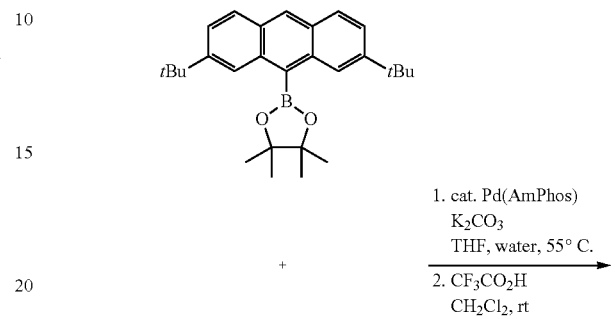

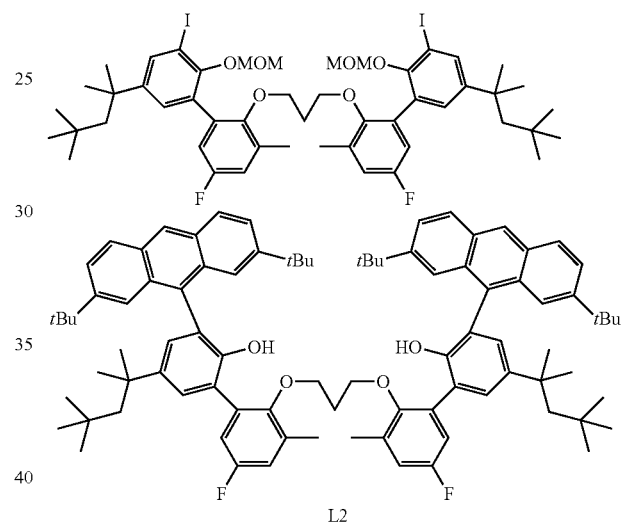

In a glovebox, a 50 mL round bottom flask was charged with 2-(2,7-di-tert-butylanthracen-9-yl)-4,4,5,5-tetramethyl-1,3,2-dioxaborolane ("boronic ester") (0.700 g, 1.68 mmol, 2.40 equivalents), 1,3-bis((5-fluoro-3'-iodo-2'-(methoxymethoxy)-3-methyl-5'-(2,4,4-trimethylpentan-2-yl)-[1,1'-biphenyl]-2-yl)oxy)propane ("diiodo ligand") (0.729 g, 0.700 mmol, 1.00 equivalents), potassium carbonate (0.484 g, 3.50 mmol, 5.00 equiv), Pd(Amphos)$Cl_2$ (25 mg, 0.035 mmol, 5.0 mol %), and 11.2 mL dry THF. A sealed reflux condenser was attached to the flask, and the unit was removed from the glovebox. Degassed water (2.6 mL) was added and the mixture was heated to 70° C. under nitrogen. After 14 hours, an aliquot was removed from the mixture for TLC and LC/MS. The results indicated remaining boronic ester, and the reaction mixture included product and mono-coupled product. An additional 5 equivalents of $K_2CO_3$ and 25 mg of the Pd(Amphos) catalyst were added to the mixture. After another 14 hours, the conversion was complete. The reaction was cooled and quenched with saturated aqueous $NH_4Cl$. Product was extracted with portions of dichloromethane. The portions of organic fractions were combined and concentrated, and the residue purified by chromatography on silica gel (0 to 10% EtOAc in hexane). The MOM-protected ligand was isolated as 0.842 g of a white solid. Without further purification, the MOM-protected ligand was deprotected. The solid was dissolved in dichloromethane (5 mL), and trifluoroacetic acid (0.28 mL, 3.7 mmol, 6.0 equivalents) was added. The resulting mixture was stirred for 2 hours. The reaction was quenched with saturated aqueous NaHCO$_3$, and product was extracted with several portions of dichloromethane. The organic fractions were combined and concentrated, and the resulting residue was purified by chromatography on silica gel (0 to 20% EtOAc in hexane). Ligand L2 was isolated as 0.193 g of a white solid, a 22% yield over two steps.

$^1$H NMR (400 MHz, CDCl$_3$) δ 8.42 (s, 2H), 7.98 (d, J=8.9 Hz, 4H), 7.60-7.54 (m, 4H), 7.52 (dd, J=8.9, 1.9 Hz, 4H), 7.46 (d, J=2.4 Hz, 2H), 7.32 (d, J=2.4 Hz, 2H), 6.95 (dd, J=9.0, 3.2 Hz, 2H), 6.84-6.75 (m, 2H), 5.70 (s, 2H), 3.72 (t, J=6.3 Hz, 4H), 1.93 (s, 6H), 1.75 (d, J=2.7 Hz, 6H), 1.39 (s, 12H), 1.19 (s, 36H), 0.79 (s, 18H).

$^{13}$C NMR (101 MHz, CDCl$_3$) δ 158.55 (d, J=242.3 Hz), 150.43 (d, J=2.4 Hz), 148.84, 147.80, 141.81, 133.36 (d, J=8.6 Hz), 133.26 (d, J=8.5 Hz), 131.57, 130.63, 130.58, 129.83, 128.48, 128.16, 125.91, 125.81, 124.60, 124.34, 120.39, 116.62 (d, J=22.3 Hz), 116.08 (d, J=22.5 Hz), 70.33, 56.64, 38.13, 34.93, 32.50, 32.14, 32.03, 31.04, 30.76, 16.56. $^{19}$F NMR (376 MHz, CDCl$_3$) δ −119.43 (t, J=8.8 Hz).

Example 18

Preparation of Procatalyst 2

In a glovebox, a 60 mL jar was charged with hafnium tetrachloride (50 mg, 0.156 mmol, 1.05 equivalents) and toluene (14 mL). The mixture was cooled in a freezer (−25° C.) for 90 minutes. A solution of methylmagnesium bromide in diethyl ether (3.0 M 0.223 mL, 0.669 mmol, 4.5 equivalents) was immediately added and the solution was vigorously stirred. After 2 minutes, the ligand L2 (0.190 g, 0.149 mmol, 1.00 equivalent) was added at once (in 2 mL toluene) and the mixture was stirred vigorously for 5 hours. The dark slurry was diluted with 20 mL hexane, and filtered through a 0.45 μm syringe filter. The colorless filtrate was concentrated to an off-white solid. This was dissolved in 20 mL dry hexane, and filtered again. The filtrate was concentrated to afford the product as 0.2006 g of a white solid, 91% yield of Procatalyst 2.

$^1$H NMR (400 MHz, C$_6$D$_6$) δ 8.47 (s, 2H), 8.28 (s, 2H), 8.04 (d, J=8.9 Hz, 2H), 8.00 (s, 2H), 7.83 (d, J=8.9 Hz, 2H), 7.70 (d, J=2.5 Hz, 2H), 7.55 (dt, J=5.1, 2.0 Hz, 4H), 7.39 (dd, J=9.0, 1.8 Hz, 2H), 7.14-7.09 (m, 2H), 6.17 (dd, J=8.2, 3.1 Hz, 2H), 3.45 (dt, J=10.5, 5.3 Hz, 2H), 3.31 (dt, J=10.1, 5.0 Hz, 2H), 1.64 (d, J=14.6 Hz, 2H), 1.55 (d, J=14.6 Hz, 2H), 1.46 (s, 18H), 1.42 (s, 6H), 1.34 (m, 8H), 1.17 (s, 18H), 0.88 (s, 6H), 0.78 (s, 18H), 1.41 (s, 6H).

$^{13}$C NMR (126 MHz, C$_6$D$_6$) δ 161.96 (d, J=224.8 Hz), 159.11, 157.65, 148.44 (d, J=2.4 Hz), 147.26, 145.97, 139.16, 136.53 (d, J=8.5 Hz), 134.99, 134.74 (d, J=8.7 Hz), 133.51, 130.89, 130.87, 130.53, 130.50, 129.01, 128.73, 128.12, 127.98, 125.53, 124.82, 123.14, 122.29, 122.11, 117.09 (d, J=22.9 Hz), 116.14 (d, J=22.6 Hz), 74.56, 56.77,

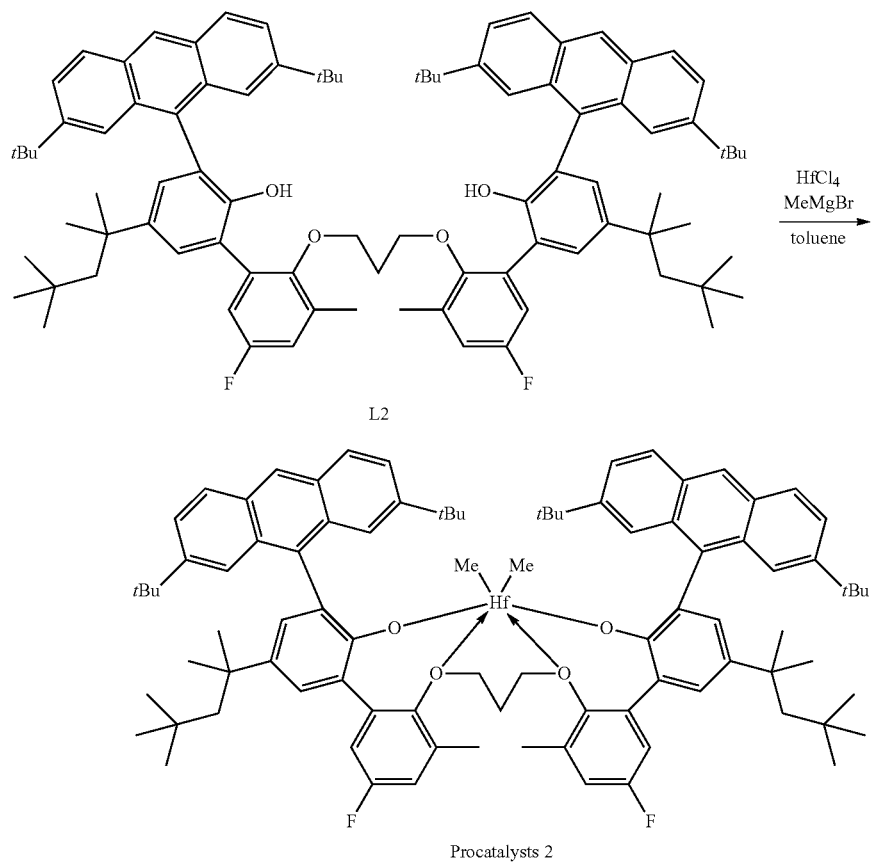

L2

Procatalysts 2

48.70, 37.77, 34.96, 34.79, 33.46, 32.31, 31.70, 31.12, 30.22, 30.05, 29.87, 16.74. $^{19}$F NMR (376 MHz, C$_6$D$_6$) δ -115.65 (t, J=8.6 Hz).

Example 19

Synthesis of Comparative Procatalyst C2

Preparation of meso-4,4'-pentane-2,4-diylbis(oxy))bis(3-bromo-1 fluorobenzene)

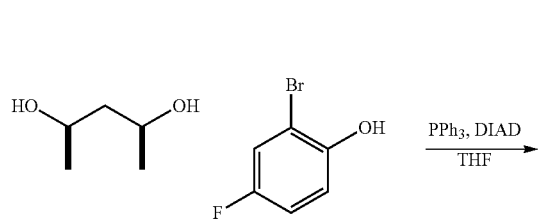

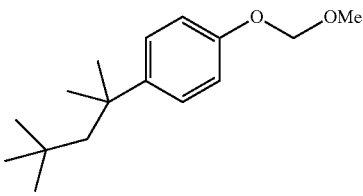

A 2-L three-necked round bottom flask, equipped with a thermometer, a magnetic stirrer, an addition funnel, and a nitrogen pad, was charged with 2,4-pentanediol (30.46 g, 292.5 mmol, 1 equiv), 2-bromo-4-fluorophenol (114.39 g, 598.9 mmol, 2.04 equiv), triphenylphosphine (157.12 g, 599.0 mmol, 2.04 equiv), and THF (600 mL), and the contents cooled to 2° C. in an ice-water bath. A solution of DIAD (121.11 g, 598.9 mmol, 2.04 equiv) in THF (130 mL), in the addition funnel, was added, at such a rate, to maintain the reaction below 5° C. (the addition took approximately 4 h). The resulting mixture was stirred at 2-° C. for an additional 1 h, and a sample was taken for GC-MS analysis, which indicated the reaction was near to completion. After stirring overnight, at ambient temperature, volatiles were removed under reduced pressure. Cyclohexane (700 mL) was added to the residue and the slurry was stirred at room temperature for 30 minutes. The insoluble solid was filtered, rinsed with cyclohexane (100 mL×3). The cyclohexane solution was washed with 1N NaOH (200 mL), water (200 mL), 1N HCl (200 mL), water (500 mL×2), and then concentrated, under reduced pressure, to give an oil residue. The oil residue was dissolved in hexane (100 mL) and then passed through a pad of silica gel (315 g), eluting with hexane (300 mL), and Hexane-EtOAc (20:1 in volume, hexane 2 L+EtOAc 100 mL), concentrated, and dried, to give the desired bottom group (123.8 grams, 94% yield).

$^1$H NMR (400 MHz, CDCl$_3$) δ 7.14 (dd, J=8.4, 3.9 Hz, 2H), 6.64 (dt, J=9.1, 3.9 Hz, 2H), 6.48 (dd, J=9.0, 3.7 Hz, 2H), 4.22 (m, 2H), 2.17 (dt, J=13.6, 6.5 Hz, 1H), 1.45 (dt, J=13.6, 5.6 Hz, 1H), and 0.98 (d, J=6.1 Hz, 6H).

$^{13}$C {$^1$H} NMR (101 MHz, CDCl$_3$) δ 156.9 (d, J=235.8 Hz), 150.9 (d, J=2.8 Hz), 120.9 (d, J=25.8 Hz), 115.62 (d, J=7.7 Hz), 114.9 (d, J=21.5 Hz), 113.7 (d, J=10.1 Hz), 72.8, 42.7, and 19.6. $^{19}$F{$^1$H} NMR (376 MHz, CDCl$_3$) δ −121.33.

Example 20

Preparation of 1-(methoxymethoxy)-4-(2,4,4-trimethylpentan-2-yl)benzene

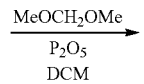

In a 500-mL flask 4-tert-octylphenol (10.0 g, 48.5 mmol) and dimethoxymethane (42.9 mL, 485 mmol) were dissolved in 240 mL CH$_2$Cl$_2$ under nitrogen. Added P$_2$O$_5$ in ca. 3 g portions over 0.5 h. The resulting mixture was stirred for an additional 2.5 h. Filtered reaction through a silica plug to remove P$_2$O$_5$. Washed filtrate with 150 mL H$_2$O, then 150 mL brine sequentially. The organic layer was dried over MgSO$_4$, filtered and concentrated. Purified by column chromatography on silica gel, eluting with 30→50% CH$_2$Cl$_2$/hexane gradient. Collected 9.07 g product (74.7% yield) as a clear oil.

$^1$H NMR (400 MHz, CDCl$_3$) δ 7.27 (d, J=8.8 Hz, 2H), 6.94 (d, J=8.8 Hz, 2H), 5.16 (s, 2H), 3.48 (s, 3H), 1.70 (s, 2H), 1.34 (s, 6H), 0.72 (s, 9H). $^{13}$C{$^1$H} NMR (101 MHz, CDCl$_3$) δ 155.04, 143.74, 127.22, 115.61, 94.79, 57.15, 56.10, 38.18, 32.48, 31.93, 31.76.

Example 21

Preparation of 2-(2-(methoxymethoxy)-5-(2,4,4-trimethylpentan-2-yl)phenyl)-4,4,5,5-tetramethyl-1,3,2-dioxaborolane

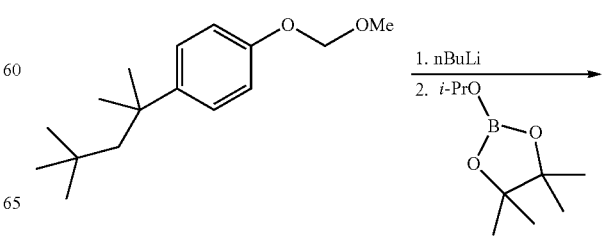

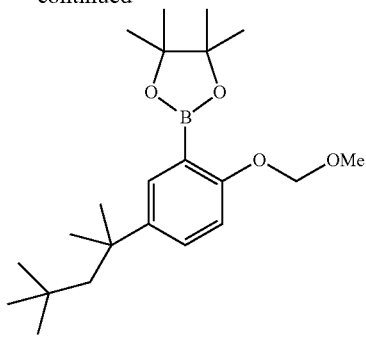

In an oven dried 1 L flask under nitrogen the protected phenolic substrate (9.07 g, 36.2 mmol) was dissolved in THF (362 mL, degassed and stored over alumina under nitrogen). This solution was cooled to 0° C., and n-BuLi (18.8 mL, 2.5 M solution in hexane, 47.1 mmol) was added slowly via syringe. The resulting solution was allowed to warm slowly to room temperature with stirring over 2 h. Isopropoxy(pinacolborane) (10.3 mL, 50.7 mmol) was then added via syringe and the mixture was stirred overnight at room temperature. The reaction was quenched with $H_2O$ (6 mL), and the volatiles were removed under vacuum, taking care not to heat the mixture excessively. The resulting residue was dissolved in $CH_2Cl_2$ (300 mL), and this solution was washed with brine (3×300 mL). The organic layer was dried over $MgSO_4$, filtered and concentrated to afford a light yellow oil. By $^1H$ NMR the material is a mixture of product and starting material, ca. 10:1 ratio. This material was used without further purification.

$^1H$ NMR (400 MHz, $CDCl_3$) δ 7.63 (d, J=2.6 Hz, 1H), 7.36 (dd, J=8.7, 2.7 Hz, 1H), 6.93 (d, J=8.7 Hz, 1H), 5.15 (s, 2H), 3.51 (s, 3H), 1.71 (s, 2H), 1.36 (s, 6H), 1.35 (s, 12H), 0.73 (s, 9H). $^{13}C\{^1H\}$ NMR (101 MHz, $CDCl_3$) δ 159.68, 143.46, 133.92, 130.22, 115.33, 95.73, 83.46, 57.05, 56.21, 38.20, 32.48, 31.99, 31.70, 24.98.

Example 22

Preparation of 9-(2-(methoxymethoxy)-5-(2,4,4-trimethylpentan-2-yl)phenyl)anthracene

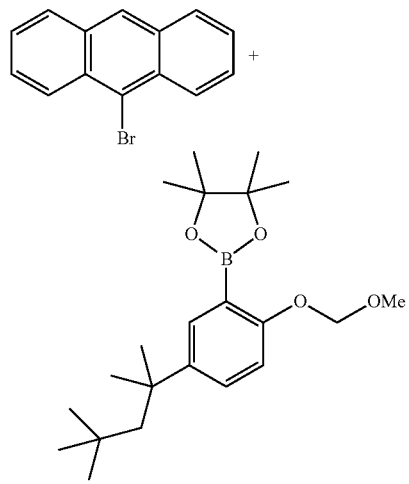

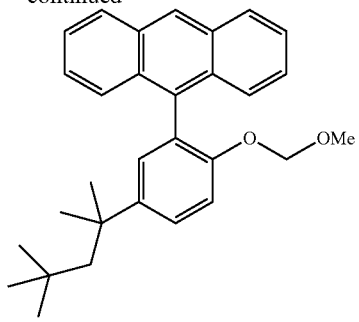

To a 200 mL flask containing the boronate ester (5.00 g, 13.3 mmol) under $N_2$ was added 9-bromoanthracene (3.11 g, 12.1 mmol), NaOH (2.90 g, 72.5 mmol), $Pd(PPh_3)_4$ (279 mg, 0.242 mmol), 50 mL of degassed toluene, and 10 mL of degassed water. The system was sparged with $N_2$. The reaction was heated to 110° C. for 72 hours. The reaction was then cooled and the volatiles were removed by rotary evaporation. The residue was taken up in $Et_2O$, washed with brine, dried over anhydrous $MgSO_4$, filtered through a pad of silica gel then concentrated to provide the crude product. This material was purified by recrystallization from MeCN, providing the product as yellow-orange needles (3.93 g, 76.3% yield).

$^1H$ NMR (400 MHz, $CDCl_3$) δ 8.49 (s, 1H), 8.05 (d, J=8.3 Hz, 2H), 7.64 (d, J=8.8 Hz, 2H), 7.49 (dd, J=8.7, 2.6 Hz, 1H), 7.45 (ddd, J=8.5, 6.5, 1.2 Hz, 2H), 7.33 (ddd, J=8.8, 6.5, 1.3 Hz, 2H), 7.26 (m, 2H), 4.87 (s, 2H), 3.01 (s, 3H), 1.72 (s, 2H), 1.37 (s, 6H), 0.80 (s, 9H).

Example 23

Preparation of 2-(3-(anthracen-9-yl)-2-(methoxymethoxy)-5-(2,4,4-trimethylpentan-2-yl)phenyl)-4,4,5,5-tetramethyl-1,3,2-dioxaborolane

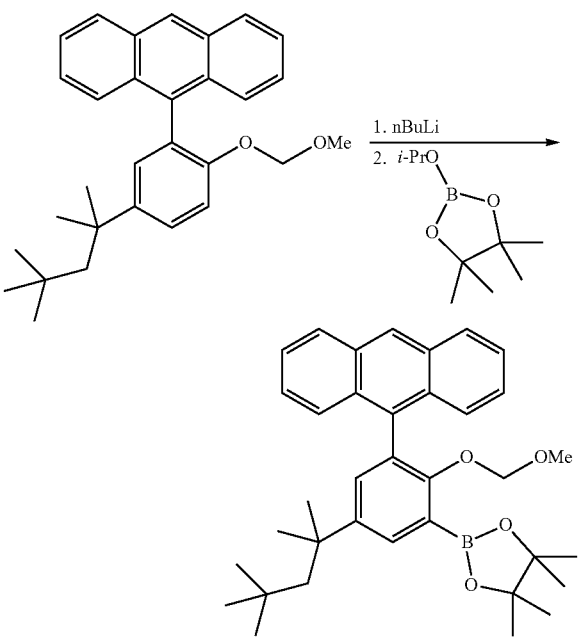

In an oven dried 250 mL flask under $N_2$ the substrate (3.93 g, 9.21 mmol) was dissolved in 92 mL anhydrous THF, and the resulting solution was cooled to 0° C. To this was added n-BuLi (4.79 mL, 2.5 M solution in hexane, 12.0 mmol) dropwise via syringe. The solution was allowed to warm slowly to room temperature with stirring over 2 h, at which point isopropoxy(pinacolborane) (2.63 mL, 12.9 mmol) was added via syringe and the resulting mixture was stirred overnight at room temperature. The reaction was quenched with 2 mL $H_2O$, and then the solvents were removed under vacuum, taking care not to heat the mixture excessively. The resulting residue was dissolved in 100 mL $CH_2Cl_2$, washed with 100 mL brine, then dried over $MgSO_4$, filtered and concentrated to afford a yellow solid. This material was triturated with MeOH. The solid softened and turned to an oil upon initial addition of MeOH, then the product precipitated as a light yellow powder (3.55 g product, 69.7% yield).

$^1$H NMR (400 MHz, CDCl$_3$) δ 8.47 (s, 1H), 8.01 (d, J=9.1 Hz, 2H), 7.92 (d, J=2.7 Hz, 1H), 7.65 (d, J=8.8 Hz, 2H), 7.43 (m, 3H), 7.34 (ddd, J=8.8, 6.5, 1.3 Hz, 2H), 4.63 (s, 2H), 1.86 (s, 3H), 1.75 (s, 2H), 1.40 (s, 6H), 1.37 (s, 12H), 0.81 (s, 9H).

$^{13}$C{$^1$H} NMR (101 MHz, CDCl$_3$) δ 159.09, 145.39, 135.02, 134.56, 134.26, 131.51, 131.41, 130.88, 128.17, 127.51, 126.39, 125.34, 125.19, 100.22, 83.79, 57.03, 55.37, 38.53, 32.61, 32.17, 31.86, 25.03.

Example 24

Preparation of 6',6'''-(((2R,4S)-pentane-2,4-diyl)bis (oxy))bis(3-(anthracen-9-yl)-3' fluoro-5-(2,4,4-trimethylpentan-2-yl)-[1,1'-biphenyl]-2-ol

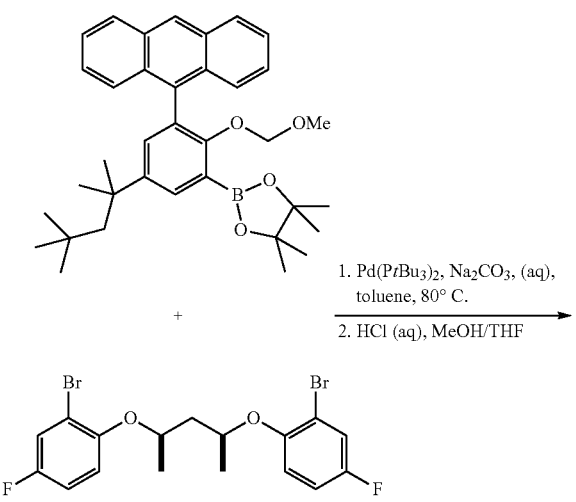

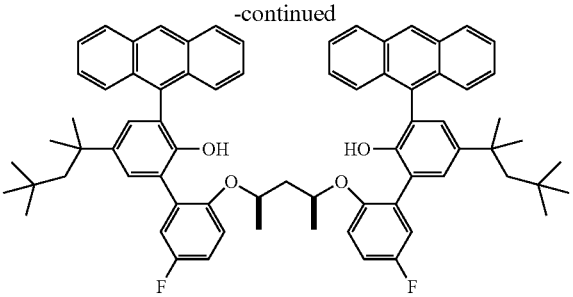

To a 100-mL flask containing the top group boronate ester (1.08 g, 1.96 mmol) under $N_2$ was added the di-bromo fragment (0.400 g, 0.889 mmol), $Na_2CO_3$ (0.565 g, 5.33 mmol), Pd(PtBu$_3$)$_2$ (0.018 g, 0.036 mmol), 30 mL of degassed THF, and 10 mL of degassed water. The system was sparged with nitrogen, and then was heated under reflux for 24 hours. The reaction was cooled and the volatiles were removed by rotary evaporation. The residue was taken up in Et$_2$O, washed with brine, dried over anhydrous MgSO$_4$, filtered through a pad of silica gel then concentrated to give protected ligand. For THP deprotection, THF (20 mL) was added, and the mixture was stirred until ligand was dissolved. To this was added 20 mL of MeOH and 2 drops of concentrated HCl. This mixture was heated under reflux for 1 hour, then removed from heat, and concentrated under vacuum. Added 50 mL water, and extracted with 80 mL Et$_2$O. The organic layer was collected and dried over MgSO$_4$, filtered, and concentrated under vacuum. This material was purified by column chromatography, eluting with 1→15% EtOAc/hexane; however, the isolated material contained an impurity, possibly singly coupled product. This material was subjected to a second column chromatography, eluting with 1→15% acetone/hexane, furnishing the desired product as a light yellow powder (0.228 g, 24.4% yield).

$^1$H NMR (400 MHz, CDCl$_3$) δ 8.52 (s, 2H), 8.04 (dd, J=15.5, 8.5 Hz, 4H), 7.68 (dd, J=13.9, 8.8 Hz, 4H), 7.42 (m, 2H), 7.38 (d, J=2.5 Hz, 2H), 7.34 (m, 2H), 7.30 (d, J=2.4 Hz, 2H), 7.26 (m, 4H), 7.16 (dd, J=9.1, 3.1 Hz, 2H), 6.68 (td, J=8.4, 8.0, 3.2 Hz, 2H), 6.54 (dd, J=9.0, 4.7 Hz, 2H), 5.96 (s, 2H), 4.39 (q, J=6.1 Hz, 2H), 2.08 (dt, J=14.2, 7.0 Hz, 1H), 1.74 (s, 4H), 1.62 (dt, J=14.3, 5.4 Hz, 1H), 1.40 (s, 6H), 1.39 (s, 6H), 1.03 (d, J=6.1 Hz, 6H), 0.81 (s, 18H).

$^{13}$C{$^1$H} NMR (101 MHz, CDCl$_3$) δ 159.07, 156.68, 149.59, 149.57, 142.29, 133.69, 131.74, 131.70, 131.68, 130.71, 130.67, 129.22, 128.67, 126.94, 126.77, 126.69, 126.16, 125.55, 125.52, 125.28, 125.23, 118.98, 118.75, 116.78, 116.69, 115.42, 115.20, 73.92, 57.32, 42.65, 38.32, 32.62, 32.13, 31.98, 31.94, 19.57. $^{19}$F{$^1$H} NMR (376 MHz, CDCl$_3$) δ 121.15.

Example 25

Preparation of Comparative C2

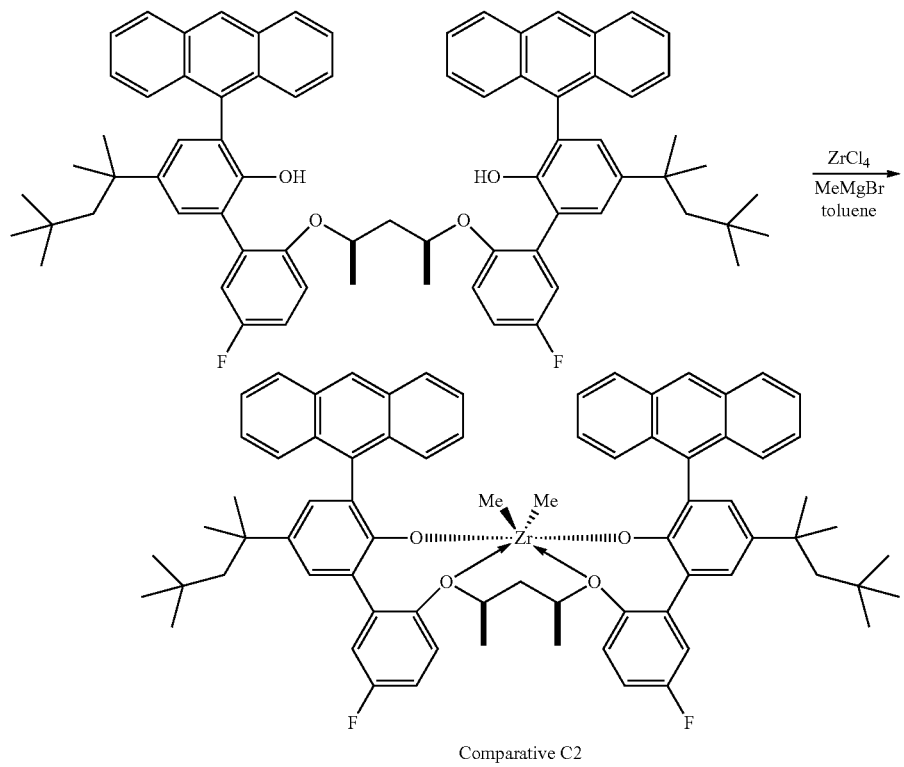

Comparative C2

In a glovebox, in an oven dried 40 mL scintillation vial with a stir bar was suspended $ZrCl_4$ (0.077 g, 0.332 mmol) in 8.3 mL toluene (anhydrous). The suspension was cooled to −30° C. MeMgBr (0.465 mL, 3.0M solution in $Et_2O$, 1.40 mmol) was added to the cold suspension with stirring. After 2 minutes, the solution darkened, and ligand $C_3$ (0.350 g, 0.332 mmol), was added. This mixture was allowed to warm to room temperature, and stirred overnight. The solvent was removed under vacuum to yield a brown solid, which was washed with ca. 80 mL hexane, then extracted with ca. 80 mL toluene, and filtered. The filtrate was concentrated to afford the product as a light brown powder (0.229 g, 58.8% yield).

$^1$H NMR (400 MHz, $C_6D_6$) δ 8.37-8.25 (m, 4H), 8.21 (d, J=8.8 Hz, 2H), 7.95 (m, 2H), 7.80 (dd, J=8.5, 4.1 Hz, 2H), 7.55 (dd, J=4.9, 2.5 Hz, 2H), 7.40 (d, J=2.5 Hz, 1H), 7.34 (d, J=2.5 Hz, 1H), 7.32-7.19 (m, 4H), 7.14-6.99 (m, 6H), 6.48 (dddd, J=9.0, 7.4, 3.2, 1.6 Hz, 2H), 4.27 (dd, J=8.9, 5.3 Hz, 1H), 4.13 (dd, J=8.9, 5.0 Hz, 1H), 4.00 (m, 2H), 1.65-1.56 (m, 4H), 1.47 (dt, J=16.8, 8.9 Hz, 1H), 1.31 (s, 3H), 1.29 (s, 3H), 1.27 (s, 3H), 1.25 (s, 3H), 1.12 (d, J=15.7 Hz, 1H), 0.88 (s, 9H), 0.83 (s, 9H), 0.43 (d, J=6.3 Hz, 3H), 0.29 (d, J=6.5 Hz, 3H), −1.21 (s, 3H), −1.29 (s, 3H). $^{19}F\{^1H\}$ NMR (376 MHz, $C_6D_6$) 6-115.36, 115.68.

Example 26

Synthesis of Procatalyst 3

Preparation of 2-(2,6-di-tert-butylanthracen-9-yl)-4-(2,4,4-trimethylpentan-2-yl)phenol

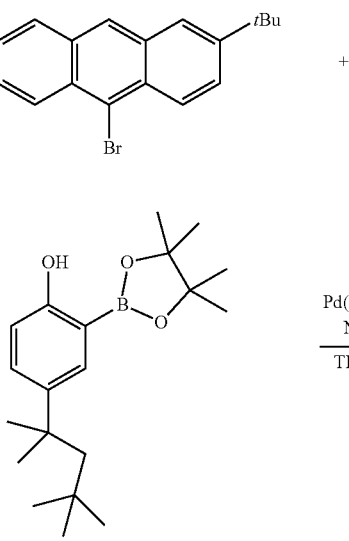

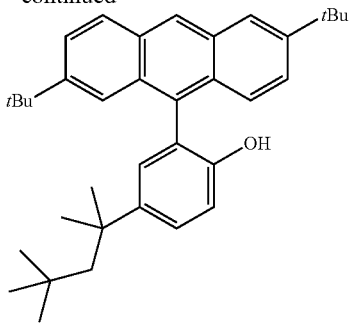

To a 40 mL scintillation vial containing 2-(4,4,5,5-tetramethyl-1,3,2-dioxaborolan-2-yl)-4-(2,4,4-trimethylpentan-2-yl)phenol (0.935 g, 2.81 mmol 9-bromo-2,6-di-tert-butylanthracene (0.828 g, 2.24 mmol), Pd catalyst (0.023 g, 0.04 mmol), and Na$_2$CO$_3$ (0.713 g, 6.73 mmol) under nitrogen was added 6.5 mL of degassed THF and 2.0 mL of degassed water. The reaction was heated at 65° C. and monitored by GC-MS. After 18 hrs, the product mixture was cooled to ambient temperature and treated with deionized water. The organic layer was separated and the aqueous layer was extracted with diethyl ether (×3). The organic layers were combined, sequentially washed with a saturated solution of sodium bicarbonate and brine, and dried with anhydrous MgSO$_4$. The solids were separated by vacuum filtration and the filtrate was concentrated in vacuo. Flash column chromatography on the residue and collection of only the pure fractions provided 0.286 g of the product in 26% yield.

$^1$H NMR (400 MHz, CDCl$_3$) δ 8.47 (s, 1H), 8.01 (d, J=9.6 Hz, 1H), 7.93 (d, J=2.0 Hz, 1H), 7.64-7.55 (m, 3H), 7.50 (d, J=2.0 Hz, 1H), 7.50-7.44 (m, 2H), 7.45 (d, J=2.4 Hz, 1H), 7.08 (d, J=8.6 Hz, 1H), 4.37 (s, 1H), 1.77 (d, J=14.5 Hz, 1H), 1.70 (d, J=14.5 Hz, 1H), 1.44 (s, 9H), 1.38 (s, 6H), 1.29 (s, 9H), 0.79 (s, 9H).

Example 27

Preparation of 6',6'''-(((2R,4S) pentane-2,4-diyl)bis(oxy))bis(3-(2,6-di-tert-butylanthracen-9-yl)-3'fluoro-5-(2,4,4-trimethylpentan-2-yl)-[1,1'-biphenyl]-2-ol)

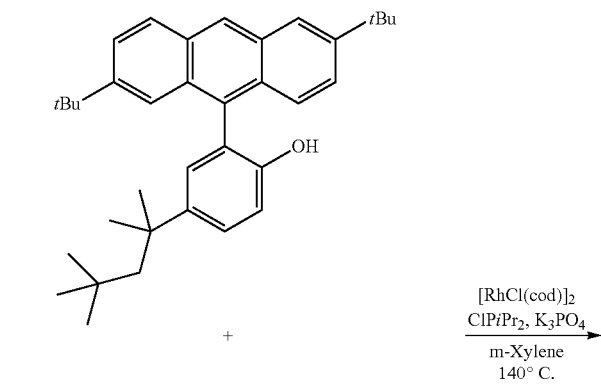

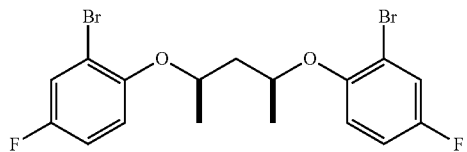

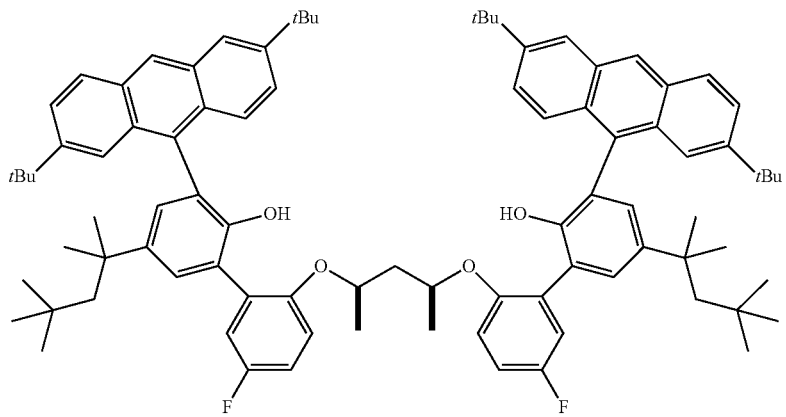

A solution of chlorodiisopropylphosphine (0.017 g, 0.11 mmol) and Rh dimer (0.014 g, 0.03 mmol) in m-xylene (2.2 mL) was added to a mixture of 2-(2,6-di-tert-butylanthracen-9-yl)-4-(2,4,4-trimethylpentan-2-yl)phenol (0.286 g, 0.58 mmol), 4,4'-(((2R,4S)-pentane-2,4-diyl)bis(oxy))bis(3-bromo-1-fluorobenzene) (0.100 g, 0.22 mmol) and anhydrous $K_3PO_4$ (0.189 g, 0.89 mmol). The mixture was heated at 140° C. for 18 hrs. Analysis of an aliquot of the reaction mixture by HPLC indicated formation of the ligand. After cooling to ambient temperature, the product mixture was directly subjected to, first, normal flash column chromatography with a gradient mixture of acetone and hexanes followed by a reverse phase chromatography with acetonitrile and THF to remove residual starting phenol. Concentration of only the pure fractions led to the isolation of 0.185 g of the ligand in 65% yield.

$^1$H NMR (400 MHz, $CDCl_3$) δ 8.44 (s, 2H), 7.99 (dd, J=9.0, 2.9 Hz, 2H), 7.94-7.88 (m, 2H), 7.61-7.49 (m, 6H), 7.35 (dt, J=4.9, 2.2 Hz, 4H), 7.12 (ddd, J=8.8, 5.5, 3.1 Hz, 2H), 6.71-6.40 (m, 4H), 5.86-5.77 (m, 1H), 5.72 (d, J=24.6 Hz, 1H), 4.35 (dt, J=12.5, 5.9 Hz, 2H), 1.83-1.64 (m, 4H), 1.54 (s, 12H), 1.41-1.33 (m, 30H), 1.26 (d, J=1.4 Hz, 9H), 1.22 (d, J=5.7 Hz, 9H), 1.04-0.93 (m, 7H), 0.81 (s, 9H), 0.79 (s, 9H). $^{19}$F NMR (376 MHz, $CDCl_3$) δ −121.46−−121.59 (m), −121.77 (d, J=42.3 Hz).

Example 28

Preparation of Procatalyst 3

In a glove box, $ZrCl_4$ (0.034 g, 0.14 mmol) was suspended in 3 mL of anhydrous toluene in a 40 mL scintillation vial equipped with a stir bar. The contents were chilled to −34° C. in the freezer. Upon temperature equilibration, the reaction vessel was removed from the freezer and treated with methyl magnesium bromide (0.21 mL of 3.0 M solution in diethyl ether) with stirring. After stirring for 4 min, the ligand (0.185 g, 0.14 mmol) was added to the reaction mixture in one portion using a powder funnel and 0.5 mL of toluene was used for rinsing. The reaction was allowed to warm to ambient temperature and stirring was continued for 0.5 h after ligand addition. $^1$H and $^{19}$F NMR analyses of an aliquot of the reaction mixture indicated the formation of the complex. The product mixture was filtered through a pad of Celite® using toluene and the filtrate was concentrated under vacuum. The residue was suspended in anhydrous hexanes and filtered using a relatively thin pad of Celite®. The filtrate was concentrated to yield first crop of the complex. The residue on the fritted funnel was then transferred to a bottle and treated with toluene. The solids were then separated by filtration with the aid of fresh Celite®. The filtrate was once again passed through a syringe filter and the resulting solution was dried in vacuo to obtain only trace amounts of solid material. 0.177 g of the product was isolated in 87% yield.

$^1$H NMR (400 MHz, $C_6D_6$) δ 8.44-8.22 (m, 4H), 8.22-8.07 (m, 3H), 8.09-7.93 (m, 3H), 7.93-7.84 (m, 2H), 7.68-7.32 (m, 9H), 7.03 (dd, J=16.4, 8.1 Hz, 1H), 6.56-6.46 (m, 2H), 4.50-4.10 (m, 2H), 4.07-3.92 (m, 2H), 1.72 (dd, J=14.3, 2.6 Hz, 2H), 1.59 (d, J=12.7 Hz, 4H), 1.43-1.07 (m, 71H), 1.02-0.64 (m, 32H), 0.54 (d, J=6.5 Hz, 1H), 0.50 (d, J=6.4 Hz, 1H), 0.43 (d, J=6.3 Hz, 1H), 0.36 (t, J=6.9 Hz, 4H), −1.22−−1.48 (series of 6 singlets, 6H). $^{19}$F NMR (376 MHz,

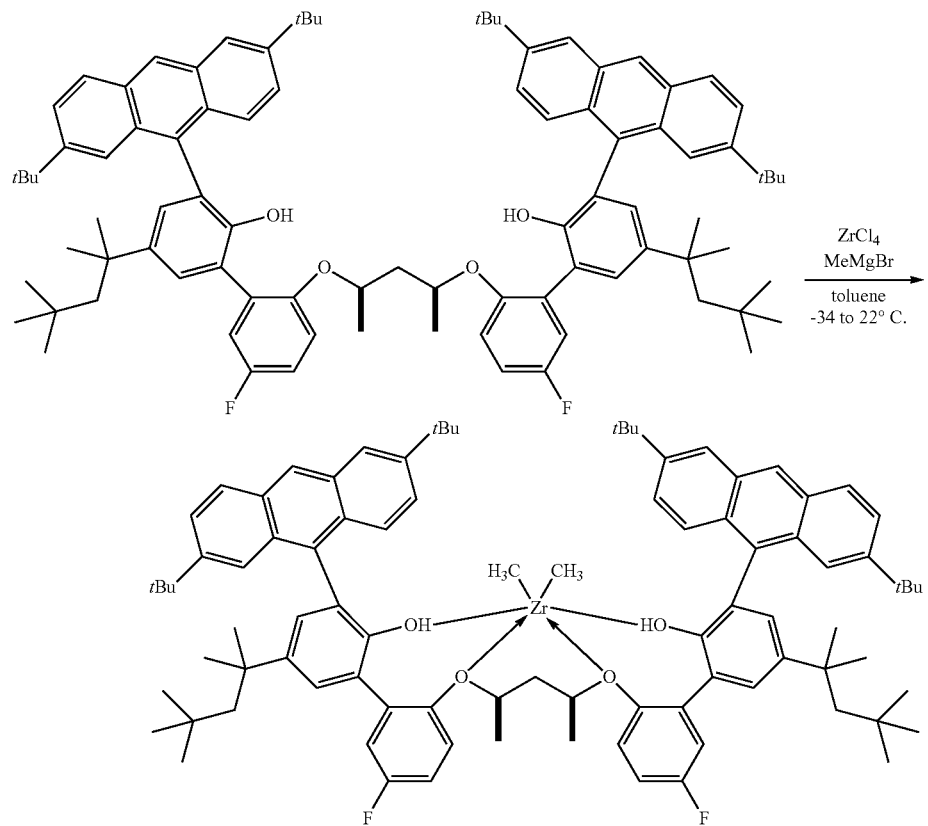

$C_6D_6$) δ −115.14 (d, J=18.5 Hz), −115.27 (d, J=16.7 Hz), −115.48 (d, J=18.7 Hz), −115.83.

Example 29

Synthesis of Procatalyst 4

Preparation of 2-(1,1,4,4,8,8,11,11-octamethyl-1,2,3,4,8,9,10,11-octahydropentacen-6-yl)-4-(2,4,4-trimethylpentan-2-yl)phenol

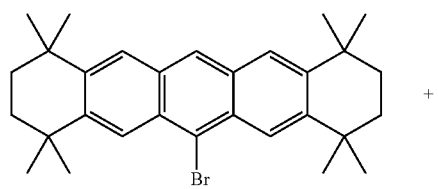

+

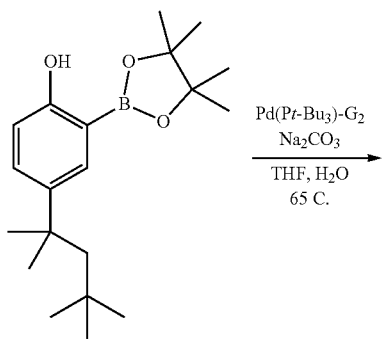

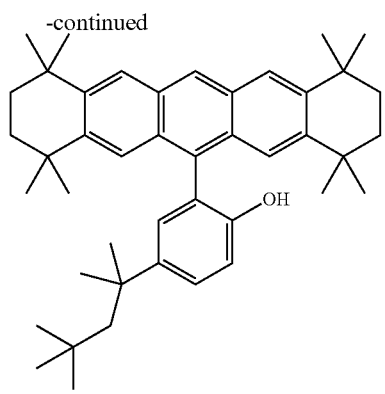

To a 40 mL scintillation vial containing 2-(4,4,5,5-tetramethyl-1,3,2-dioxaborolan-2-yl)-4-(2,4,4-trimethylpentan-2-yl)phenol (0.717 g, 2.16 mmol), 6-bromo-1,1,4,4,8,8,11,11-octamethyl-1,2,3,4,8,9,10,11-octahydropentacene (1.00 g, 2.09 mmol), Pd catalyst (0.021 g, 0.04 mmol), and $Na_2CO_3$ (0.666 g, 6.28 mmol) under nitrogen was added 6.4 mL of degassed THF and 3.2 mL of degassed water. The reaction was heated at 65° C. and monitored by HPLC. After 18 hrs, the product mixture was cooled to ambient temperature and treated with deionized water. The organic layer was separated and the aqueous layer was extracted with diethyl ether (×3). The organic layers were combined, sequentially washed with a saturated solution of sodium bicarbonate and brine, and dried with anhydrous $MgSO_4$. The solids were separated by vacuum filtration and the filtrate was concentrated in vacuo. Flash column chromatography on the residue provided 1.08 g (85%) of the product.

$^1$H NMR (400 MHz, $CDCl_3$) δ 8.33 (s, 1H), 7.94 (s, 2H), 7.61 (s, 2H), 7.24 (s, 1H), 7.09 (d, J=8.6 Hz, 1H), 4.45 (s, 1H), 1.80-1.69 (m, 10H), 1.44 (s, 12H), 1.38 (s, 6H), 1.23 (s, 6H), 1.20 (s, 6H), 0.76 (s, 9H).

Example 30

Preparation of 6',6'''-(((2R,4S)pentane-2,4-diyl)bis(oxy))bis(3' fluoro-3-(1,1,4,4,8,8,11,11-octamethyl-1,2,3,4,8,9,10,11-octahydropentacen-6-yl)-5-(2,4,4-trimethylpentan-2-yl)-[1,1'-biphenyl]-2-ol)

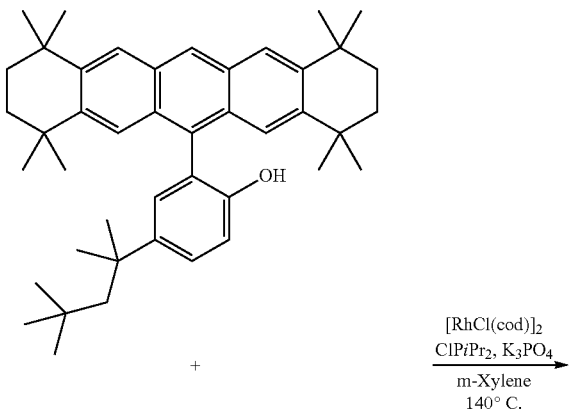

+

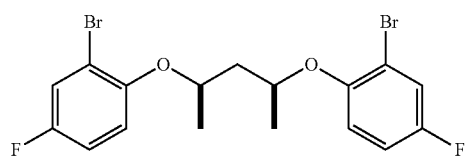

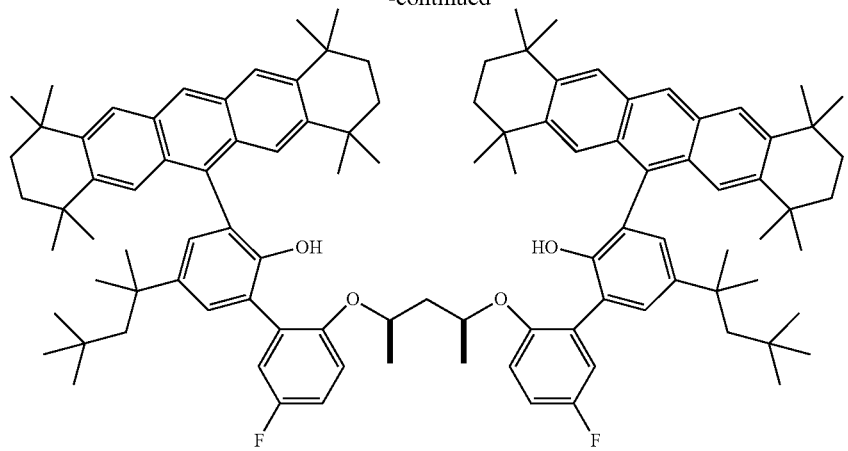

A solution of chlorodiisopropylphosphine (0.042 g, 0.28 mmol) and Rh dimer (0.034 g, 0.07 mmol) in m-xylene (5.6 mL) was added to a mixture of the phenol (0.837 g, 1.39 mmol), the dibromo fragment (0.250 g, 0.56 mmol) and anhydrous $K_3PO_4$ (0.472 g, 2.22 mmol). The mixture was heated at 140° C. for 18 h. Analysis of an aliquot of the reaction mixture by HPLC indicated formation of the product. After cooling to ambient temperature, the product mixture was directly subjected to, first, normal flash column chromatography with a gradient mixture of acetone and hexanes followed by a reverse phase chromatography with acetonitrile and THE to remove residual starting phenol. Concentration of only the pure fractions led to the isolation of the ligand.

$^1$H NMR (400 MHz, $CDCl_3$) δ 8.32 (s, 2H), 7.93 (s, 4H), 7.63 (s, 2H), 7.58 (s, 2H), 7.35 (s, 2H), 7.09 (dd, J=9.0, 3.0 Hz, 2H), 6.71-6.55 (m, 4H), 5.29 (s, 2H), 4.36-4.28 (m, 2H), 2.05 (dt, J=13.9, 6.8 Hz, 1H), 1.79-1.63 (m, 22H), 1.39 (dd, J=21.2, 7.0 Hz, 39H), 1.21-1.10 (m, 26H), 0.98 (dd, J=8.1, 6.4 Hz, 8H), 0.78 (s, 18H). $^{19}$F NMR (376 MHz, $CDCl_3$) δ−122.13.

Example 31

Preparation of Procatalyst 4

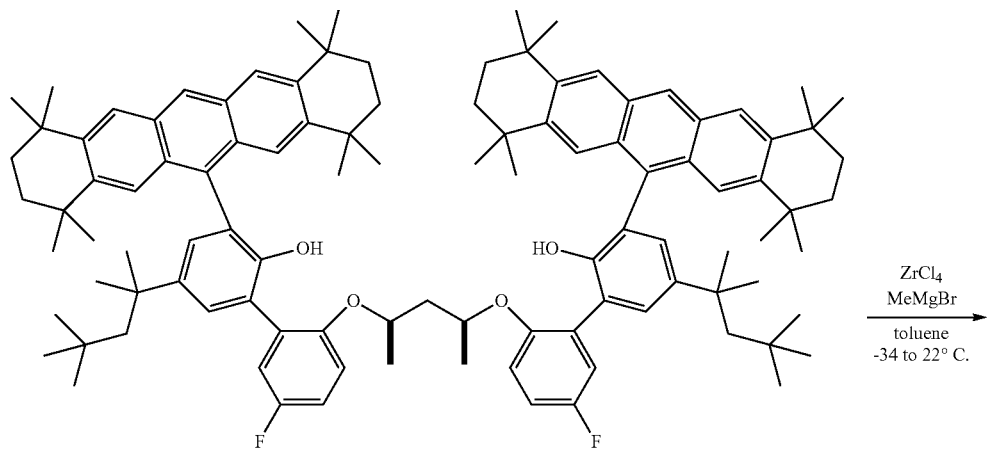

-continued

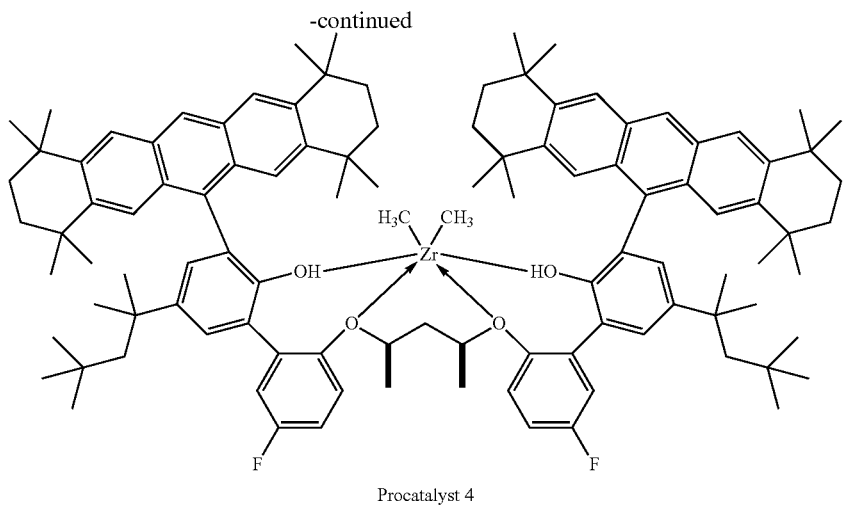

Procatalyst 4

In a glove box, ZrCl$_4$ (0.035 g, 0.15 mmol) was suspended in 4 mL of anhydrous toluene in a scintillation vial equipped with a stir bar. The contents were chilled to −34° C. in the freezer. Upon temperature equilibration, the reaction vessel was removed from the freezer and treated with methylmagnesium bromide (0.22 mL of 3.0 M solution in diethyl ether) with stirring. After stirring for 4 min, the ligand (0.226 g, 0.15 mmol) was added to the reaction mixture in one portion using a powder funnel and 1 mL of toluene was used for rinsing. The reaction was allowed to warm to ambient temperature and stirring was continued for a total of 2 h after ligand addition. $^1$H and $^{19}$F NMR analyses of an aliquot of the reaction mixture indicated clean metalation and formation of the complex. The product mixture was filtered through a pad of Celite® using toluene and the filtrate was concentrated under vacuum. The residue was suspended in anhydrous hexanes and filtered using a relatively thin pad of Celite®. The filtrate was concentrated to yield first crop of the complex (0.067 g). The residue on the fritted funnel was then transferred to a bottle and treated with toluene. The solids were then separated by filtration with the aid of fresh Celite®. The filtrate was once again passed through a syringe filter and the resulting solution was dried in vacuo to obtain 0.158 g of the complex. The combined yield for the reaction was 0.225 g (91%).

$^1$H NMR (400 MHz, C$_6$D$_6$) δ 8.32 (s, 1H), 8.28 (d, J=7.1 Hz, 2H), 8.22-8.15 (m, 4H), 8.11 (d, J=4.3 Hz, 2H), 8.01 (d, J=2.5 Hz, 2H), 7.66-7.62 (m, 2H), 7.40 (d, J=2.4 Hz, 1H), 7.36 (d, J=2.1 Hz, 2H), 7.27 (td, J=8.8, 3.1 Hz, 2H), 6.60 (td, J=8.1, 3.0 Hz, 2H), 4.43 (dd, J=8.8, 5.2 Hz, 1H), 4.33 (dd, J=8.9, 5.0 Hz, 1H), 4.13-4.06 (m, 1H), 3.83-3.77 (m, 1H) 1.94-1.50 (m, 20H), 1.43-1.40 (m, 18H), 1.34-1.11 (series of s, 48H), 0.88 (s, 9H), 0.86 (s, 9H), 0.31 (m, 6H), −1.32 (s, 6H). $^{19}$F NMR (376 MHz, C$_6$D$_6$) δ −115.07, −115.44.

Example 32

Polymerization Results

The polymerizations were carried out in a batch reactor according to the procedure previously described in this disclosure. Specifically, for the results summarized in Table 1, a 2 L batch reactor was heated to 190° C. In the batch reactor, 300 grams of octene, and 400 psig of ethylene were reacted in the presences of 520 g of Isopar™ E. The activator-to-procatalyst ratio was approximately 1.2; and 10 μmol of MMAO was added to the reaction as an impurity scavenger. The polymerization reaction ran for 10 minutes.

Specifically, for the results summarized in Table 2, a 3.8 L batch reactor was heated to either 160 or 190° C. In the batch reactor, 100 grams of octene, and 400 psi psig of ethylene were reacted in the presences of 1.47 kg of Isopar™ E. The activator-to-procatalyst ratio was approximately 1.2; and the scavenger to catalyst ration was approximately 50.

The Procatalysts 1, 2, 3 and 4 and the Comparative Procatalysts C1 and C2 (herein "Comparative C1" and "Comparative C2") were intermixed with an activator to form a catalyst system. The Procatalysts 1 and 2 have a structure according to the metal-ligand complex of formula (I). Specifically, the Procatalysts and Comparative Procatalysts had the following structures:

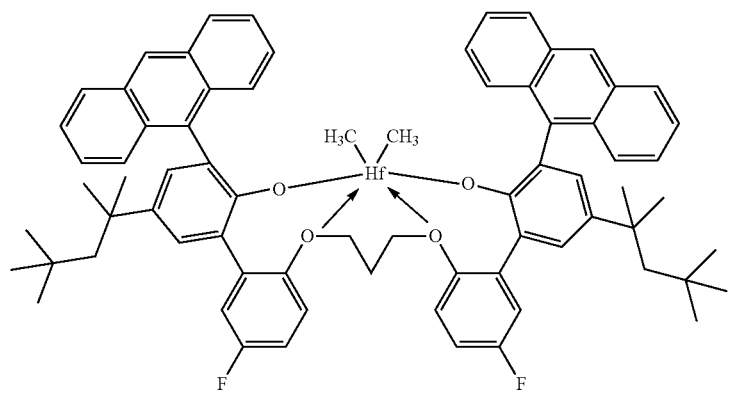
Comparative C1
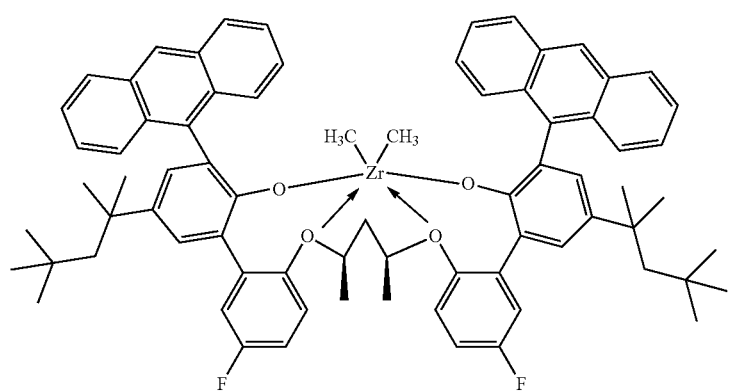
Comparatice C2
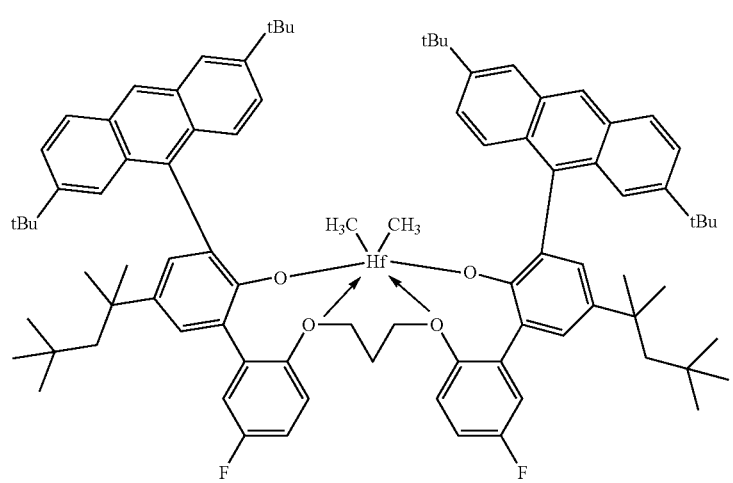
Procatalyst 1

-continued
Procatalyst 2
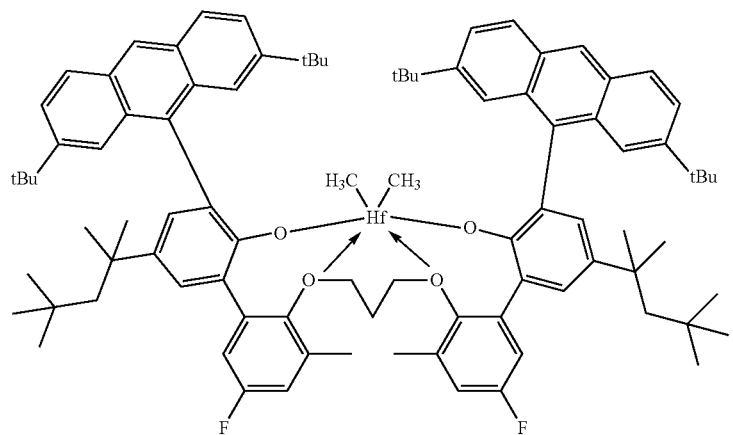
Procatalyst 3
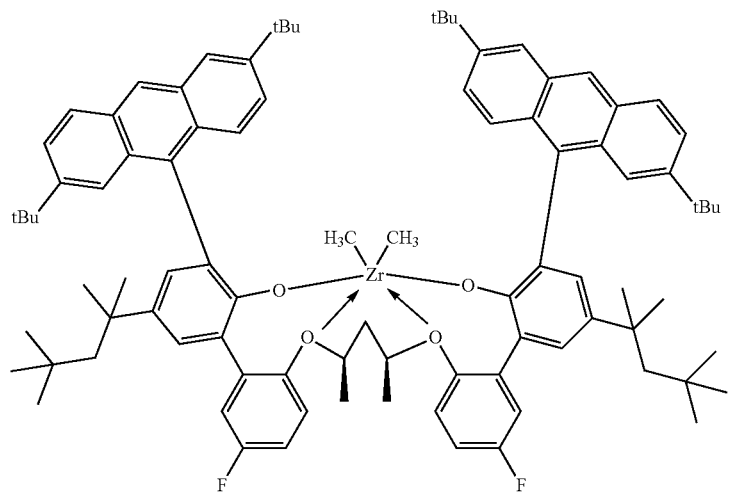
Procatalyst 4
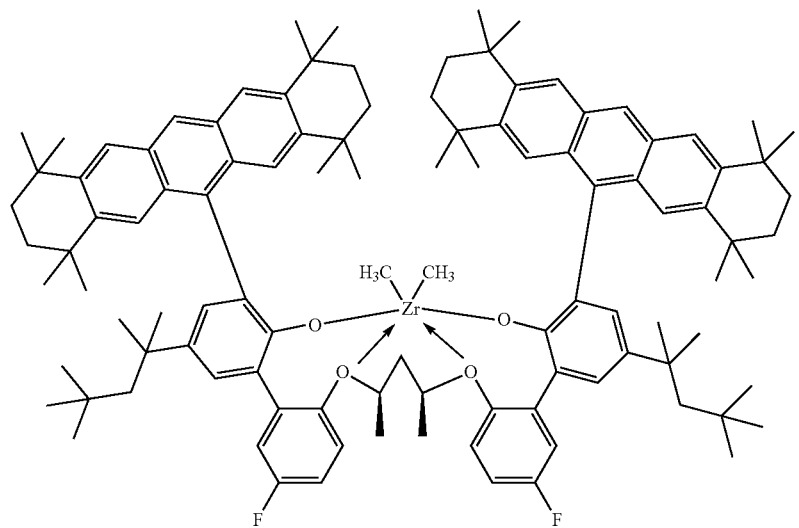

The efficiencies and octene incorporation in mole percent (mol %) and/or the melting point of the polymer of the inventive Procatalysts 1, 2, 3 and 4, and Comparative C1 and C2, and the polymer characteristics of the polymers yielded from the inventive Procatalyst 1, 2, 3 and 4, and Comparative C1 and C2 were determined. The results are summarized in Table 1 and Table 2.

TABLE 1

Batch Reactor Polymerization Results for Procatalysts 1 and 2:

| Catalyst Name | Catalyst (μmol) | Yield (g) | Efficiency (MMg poly/g M) | Tm (° C.) | Octene mol % | $M_w$ (kg/mol) | PDI |
|---|---|---|---|---|---|---|---|
| Comparative C1 | 0.04 | 29.3 | 4.10 | 34.4 | 16.6 | 150 | 2.3 |
| Comparative C1 | 0.04 | 25.7 | 3.60 | 31.8 | 16.9 | 146 | 2.3 |
| Procatalyst 1 | 0.03 | 16.2 | 3.02 | 65.7 | 10.6 | 186 | 2.3 |
| Procatalyst 1 | 0.03 | 16.2 | 3.02 | 66.0 | 11.1 | 192 | 2.3 |
| Procatalyst 2 | 0.05 | 13.0 | 1.46 | 114.7 | 1.8 | 72 | 2.3 |
| Procatalyst 2 | 0.05 | 14.6 | 1.64 | 116.1 | 1.8 | 71 | 2.2 |

Polymerization conditions: 190° C.; Isopar-E ™: 520 mL; 1-octene: 300 g; ethylene pressure: 400 psi; Run time: 10 minutes; procatalyst to activator ratio is 1:1.2; activator = [HNMe($C_{18}H_{37}$)$_2$][B($C_6F_5$)$_4$]; 10 μmol MMAO 50 μmoles. M = Zr or Hf

TABLE 2

Batch Reactor Polymerization Results for Procatalyst 3 and 4:

| Catalyst Name | Temp. (° C.) | Catalyst (μmol) | Yield (g) | Efficiency (MM g poly/g M) | $T_m$ (° C.) | $M_w$ (kg/mol) | PDI |
|---|---|---|---|---|---|---|---|
| Comparative C2 | 160 | 0.072 | 50 | 5.48 | 105 | 903 | 2.50 |
| Procatalyst 3 | 160 | 0.18 | 46.3 | 2.54 | 114 | 1,136 | 2.10 |
| Procatalyst 4 | 160 | 0.3 | 57.57 | 2.08 | 125 | 1,315 | 2.35 |
| Comparative C2 | 190 | 0.14 | 9.7 | 1.06 | 105 | 503 | 1.98 |
| Procatalyst 3 | 190 | 0.75 | 5.5 | 0.08 | 113 | 582 | 1.88 |
| Procatalyst 4 | 190 | 0.43 | 29.5 | 0.81 | 124 | 736 | 2.01 |

Polymerization conditions: Isopar-E ™: 1.47 Kg; 1-octene: 100 g; ethylene pressure: 400 psi; [HNMe($C_{18}H_{37}$)$_2$][B($C_6F_5$)$_4$]:catalyst = 1.2; MMAO-3A:catalyst = 50. M = Zr or Hf The data in Table 1 illustrate that polymerization systems including Procatalyst 1 or Procatalyst 2 have higher ethylene selectivity than that of Comparative C1 and produce polymers with lower octene content under the same polymerization conditions. Comparative C1 has relatively low ethylene selectivity. Ethylene selectivity is inversely related to octene incorporation. Therefore, the lower the octene content in the polymer resins produced from Procatalysts 1 and 2, compared to that produced by Comparative C1, demonstrates that Procatalysts 1 and 2 have higher selectivity relative to Comparative C1.

The data in Table 2 illustrate that polymerization systems including Procatalyst 3 or Procatalyst 4 have higher ethylene selectivity than polymerization system including Comparative C2. Procatalyst 3 or Procatalyst 4 produce polymers with lower octene incorporation than polymerization system including Comparative C2 under the same polymerization conditions.

These new complexes can be useful for ethylene/alpha-olefin copolymerization reactions performed in solution or in the gas phase.

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an)(Bridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

The invention claimed is:

1. A catalyst system comprising a metal-ligand complex according to formula (I):

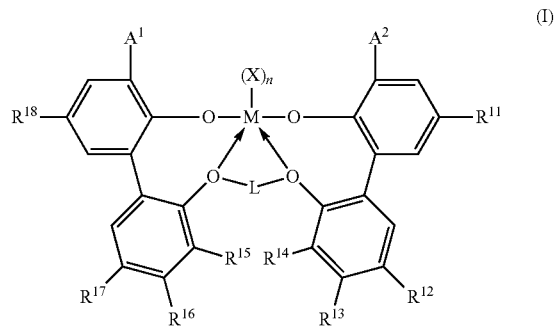

where:
M is a metal chosen from zirconium or hafnium, the metal being in a formal oxidation state of +2, +3, or +4;
n is 0, 1, or 2;
when n is 1, X is a monodentate ligand or a bidentate ligand;
when n is 2, each X is independently a monodentate ligand;
the metal-ligand complex is overall charge-neutral;
L is —CH$_2$(R$^C$)$_2$CH$_2$—, —CH(CH$_3$)CH$_2$CH(CH$_3$)—, cyclohexane-1,2-diyldimethyl, or —CH$_2$(CH$_2$)$_n$CH$_2$— where n is from 1 to 3;
either:
A$^1$ and A$^2$ are

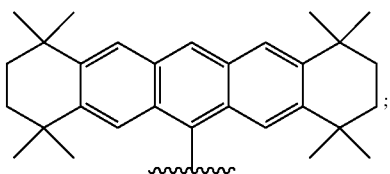 [SMILES: *c1c2cc3c(cc2cc2cc4c(cc12)C(C)(C)CCC4(C)C)C(C)(C)CCC3(C)C]

or
A$^1$ is

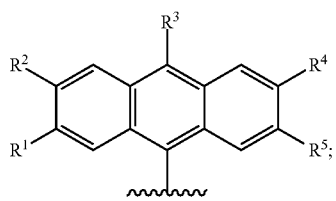

and A$^2$ is

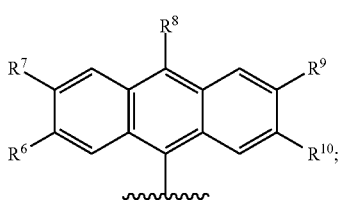

R$^1$ and R$^{10}$ are selected from the group consisting of (C$_3$-C$_{10}$)alkyl, —Si (R$^C$)$_3$, and —Ge(R$^C$)$_3$;
R$^2$, R$^4$, R$^5$, R$^6$, R$^7$, and R$^9$ are selected from the group consisting of (C$_3$-C$_{10}$)alkyl, —Si(R$^C$)$_3$, —Ge(R$^C$)$_3$, and —H, provided at least one of R$^2$, R$^4$, or R$^5$ are (C$_3$-C$_{10}$)alkyl, —Si(R$^C$)$_3$, or —Ge (R$^C$)$_3$ and at least one of R$^6$, R$^7$, or R$^9$ are (C$_3$-C$_{10}$) alkyl, —Si(R$^C$)$_3$, or —Ge(R$^C$)$_3$;
R$^3$ and R$^8$ are selected from the group consisting of (C$_1$-C$_{50}$)alkyl, (C$_6$-C$_{50}$)aryl, (C$_6$-C$_{50}$)heteroaryl, and —H;
R$^{11}$, R$^{12}$, R$^{13}$, R$^{14}$, R$^{15}$, R$^{16}$, R$^{17}$, and R$^{18}$ are independently selected from the group consisting of (C$_1$-C$_{20}$) alkyl, (C$_1$-C$_{20}$)heteroalkyl, —Si(R$^C$)$_3$, —OR$^C$, —CF$_3$, halogen, and —H; and
each R$^C$ in formula (I) is independently (C$_1$-C$_{20}$)alkyl or —H.

2. The catalyst system of claim 1, wherein:
A$^1$ and A$^2$ are

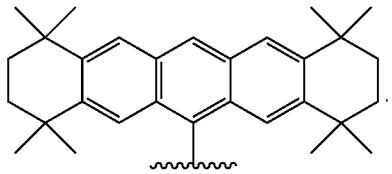 [SMILES: *c1c2cc3c(cc2cc2cc4c(cc12)C(C)(C)CCC4(C)C)C(C)(C)CCC3(C)C]

3. The catalyst system of claim 2, wherein:
L is —CH$_2$(R$^C$)$_2$CH$_2$—, —CH$_2$Ge(R$^C$)$_2$CH$_2$—, —CH(CH$_3$)CH$_2$CH(CH$_3$)—, cyclohexane-1,2-diyldimethyl, or —CH$_2$(CH$_2$)$_n$CH$_2$— where n is from 1 to 3; and
R$^{11}$ and R$^{18}$ are tert-octyl or n-octyl.

4. The catalyst system of claim 2, wherein:
L is —CH(CH$_3$)CH$_2$CH(CH$_3$)— or —CH$_2$CH$_2$CH$_2$—;
R$^{11}$ and R$^{18}$ are tert-octyl; and
R$^{12}$ and R$^{17}$ are halogen.

5. The catalyst system of claim 1, wherein:
A$^1$ is

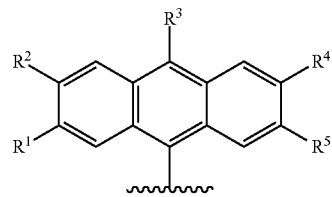

and A$^2$ is

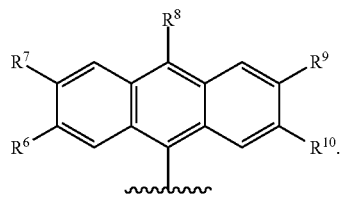

6. The catalyst system of claim 5, wherein A$^1$ and A$^2$ are identical.

7. The catalyst system of claim 1, wherein:
A$^1$ is

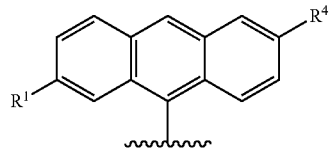

and A$^2$ is

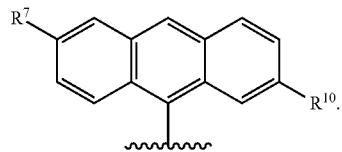

8. The catalyst system of claim 7, wherein:
$R^1$, $R^4$, $R^7$, and $R^{10}$ are $(C_3-C_{10})$alkyl.

9. The catalyst system of claim 7, wherein:
$R^1$, $R^4$, $R^7$, and $R^{10}$ are tert-butyl, tert-octyl, or —SiMe$_3$.

10. The catalyst system of claim 7, wherein:
$R^1$, $R^4$, $R^7$, and $R^{10}$ are tert-butyl.

11. The catalyst system of claim 7, wherein:
$R^1$, $R^4$, $R^7$, and $R^{10}$ are tert-butyl;
L is —CH(CH$_3$)CH$_2$CH(CH$_3$)— or —CH$_2$CH$_2$CH$_2$—; and
$R^{11}$ and $R^{18}$ are tert-octyl or n-octyl.

12. The catalyst system of claim 7, wherein:
$R^1$, $R^4$, $R^7$, and $R^{10}$ are tert-butyl;
L is —CH(CH$_3$)CH$_2$CH(CH$_3$)— or —CH$_2$CH$_2$CH$_2$—;
$R^{11}$ and $R^{18}$ are tert-octyl or n-octyl; and
$R^{12}$ and $R^{17}$ are halogen.

13. The catalyst system of claim 1, wherein:
$A^1$ is

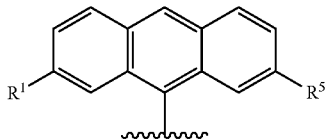

and $A^2$ is

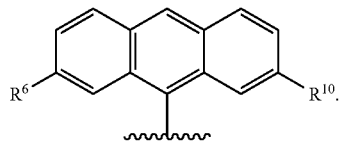

14. The catalyst system of claim 13, wherein:
$R^1$, $R^5$, $R^6$, and $R^{10}$ are $(C_3-C_{10})$alkyl.

15. The catalyst system of claim 13, wherein:
$R^1$, $R^5$, $R^6$, and $R^{10}$ are tert-butyl, tert-octyl, —SiMe$_3$, or —GeMe$_3$.

16. The catalyst system of claim 13, wherein:
$R^1$, $R^5$, $R^6$, and $R^{10}$ are tert-butyl.

17. The catalyst system of claim 13, wherein:
$R^1$, $R^5$, $R^6$, and $R^{10}$ are tert-butyl;
L is —CH$_2$(R$^C$)$_2$CH$_2$—, —CH$_2$Ge(R$^C$)$_2$CH$_2$—, —CH(CH$_3$)CH$_2$CH(CH$_3$), cyclohexane-1,2-diyldimethyl, or —CH$_2$(CH$_2$)$_n$CH$_2$— where n is from 1 to 3; and
$R^{11}$ and $R^{18}$ are tert-octyl or n-octyl.

18. The catalyst system of claim 13, wherein:
$R^1$, $R^5$, $R^6$, and $R^{10}$ are tert-butyl;
Lis-CH (CH3) CH2CH (CH3)-or-CH2CH2CH2—;
$R^{11}$ and $R^{18}$ are tert-octyl or n-octyl; and
$R^{12}$ and $R^{17}$ are halogen.

19. A polymerization process comprising:
polymerizing ethylene and one or more olefins in the presence of a catalyst system according to claim 1, under olefin polymerizing conditions to form an ethylene-based polymer.

* * * * *